United States Patent [19]

Imamura et al.

[11] Patent Number: 5,764,444
[45] Date of Patent: Jun. 9, 1998

[54] MECHANISM FOR MINUTE MOVEMENT OF A HEAD

[75] Inventors: Takahiro Imamura; Yoshifumi Mizoshita, both of Kawasaki, Japan

[73] Assignee: Fujitsu Limited, Kanagawa, Japan

[21] Appl. No.: 384,438

[22] Filed: Feb. 2, 1995

Related U.S. Application Data

[63] Continuation of Ser. No. 30,034, Mar. 19, 1993, abandoned.

[30] Foreign Application Priority Data

Jul. 23, 1991 [JP] Japan ................. 3-182226

[51] Int. Cl.⁶ ........................................... G11B 5/54
[52] U.S. Cl. ........................................... 360/109
[58] Field of Search ........................... 360/105, 106, 360/109, 104

[56] References Cited

U.S. PATENT DOCUMENTS

| 4,814,908 | 3/1989 | Schmitz ................... 360/109 |
| 5,189,578 | 2/1993 | Mori et al. ............... 360/106 |

FOREIGN PATENT DOCUMENTS

| 59-96571 | 6/1984 | Japan. | |
| 59-203272 | 11/1984 | Japan. | |
| 6275988 | 4/1987 | Japan | 360/105 |
| 63-291271 | 11/1988 | Japan. | |
| 2-227886 | 9/1990 | Japan. | |
| 2227886 | 9/1990 | Japan | 360/109 |
| 3-69072 | 3/1991 | Japan. | |
| 0445062 | 10/1974 | U.S.S.R. | 360/105 |

OTHER PUBLICATIONS

Imamura et al, "Piezoelectric Microactuator Compensating for Off-Track Errors in Magnetic Disk Drives," Oct. 4, 1992, pp. 119-126.

"Dynamic Head/Suspension Assembly Prezord Adjustment," Jun. 1986 Reproduced from Research Disclosure.

Dushkes and Surty, "Dynamically Adjustable Read–Write Head", IBM Technical Disclosure Y13N1.

*Primary Examiner*—Stuart S. Levy
*Assistant Examiner*—David D. Davis
*Attorney, Agent, or Firm*—Nikaido Marmelstein Murray & Oram LLP

[57] ABSTRACT

In a device which is adapted to write and read an information on and from a recording disk through a head and includes a head actuator for moving the head in a radial direction of the recording disk so as to position the head at a desired recording track on the recording disk, a mechanism for minute movement of a head provided at a part of the head actuator is capable of moving the head a very small distance independently of an operation of the head actuator. This mechanism for minute movement of a head is provided with expansion regions which are arranged symmetrically with respect to a center line of the head actuator and are separated by a clearance. Expansion members which are fixed on both or either of front and rear surfaces of the expansion regions, cause the expansion regions to expand or contract by the deformation thereof produced according to application of the power. A fixed region, which is provided continuously with an end of the expansion regions in an expanding direction thereof, is not displaced according to the expansion or contraction of the expansion regions. A movable region, which is provided continuously with the other end of the expansion regions in the expanding direction thereof, is displaced according to the expansion or contraction of the expansion region. A at least one hinge portion, which is formed between the movable region and the fixed region or between the movable region and the expansion region, displaces the movable region smoothly in a moving plane of the head.

37 Claims, 28 Drawing Sheets

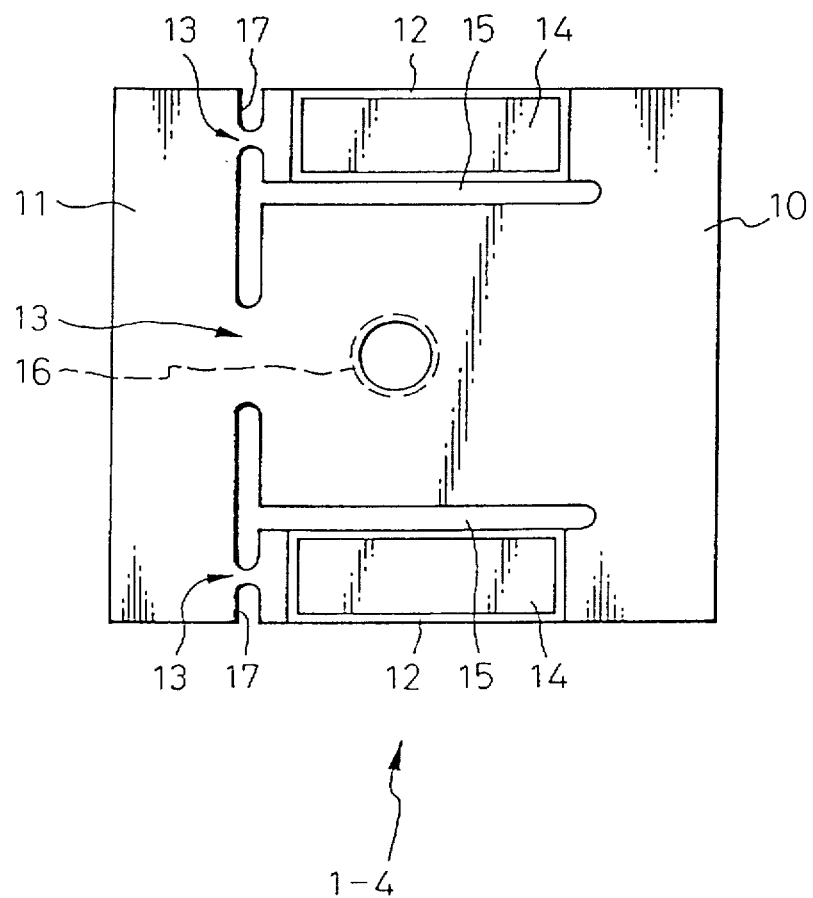

5,764,444

MECHANISM FOR MINUTE MOVEMENT OF A HEAD

This application is a continuation of application Ser. No. 08/030,034 filed Mar. 19, 1993 now abandoned.

TECHNOLOGICAL FIELD

Field of Industrial Utilization

This invention relates to a mechanism for minute movement of a head mechanism and, particularly to a head moving mechanism for adjusting the position of a head minutely by forcibly displacing a part of a movable member loading a head for scanning a recording disk in a radial direction thereof.

TECHNOLOGICAL BACKGROUND

Recently, a disk filing device such as a magnetic disk drive used widely as an external storage for a computer has been required to have an increased storage capacity and a small size. Reflecting this requirement, there is a demand for realization of high density recording by narrowing the width of recording tracks and the spacing between the tracks in the recording disk. To this end, it has become critical to improve the recording disk and to increase the accuracy of positioning a read/write head which moves in the radial direction of the recording disk across the recording tracks.

FIGS. 1 and 2 shows an exemplary construction of a hard disk drive using conventional magnetic disks. The hard disk drive includes a spindle S which rotates at a high speed of about 3600 rpm to 5400 rpm. On this spindle S are mounted a plurality of magnetic disks D (for example, ten disks) at specified intervals. Each magnetic disk D is constructed such that data can be recorded on opposite surfaces thereof. The data is written on and read from the magnetic disk D through a magnetic head H provided at one or both surfaces of each magnetic disk D. The magnetic head H is moved over the magnetic disk D by an actuator HA including a magnetic head supporting mechanism ASSY and a movable member (an access arm, hereinafter referred to merely as an arm) A. There are two types of the actuator HA for moving the magnetic head H: a linear type and a pivotal type. However, the pivotal actuator shown in FIGS. 1 and 2 is used more frequently.

The pivotal actuator HA is rotatable (pivotal) within a specified angle range, and a pivot motor SM, capable of minutely controlling an angle of rotation, is used. The pivot motor SM includes a stator ST and a rotor R. From the rotor R are projecting the arms A the number of which is equal to, or less or more than the number of magnetic disks D mounted on the spindle S, by one (nine arms in the figures). At a leading end of each arm A is mounted the magnetic head supporting mechanism ASSY including two magnetic heads H mounted in such a manner as to be opposed to each other with the magnetic disk positioned therebetween.

The rotor R of the pivot motor SM is arranged in the vicinity of the magnetic disks D as shown in FIG. 2, such that a movable range α of the magnetic heads H of the magnetic head supporting mechanisms ASSY mounted at the leading ends of the arms A projecting from the rotor R coincides with recording regions of the magnetic disks D.

In the magnetic head supporting mechanism ASSY, the magnetic heads H are mounted to the arm A though a plate-like support spring for biasing the heads H toward the magnetic disk so as to move the heads H closer to the magnetic disk D. The support spring is very thin, and it is difficult to fix this support spring directly to the leading end of the arm A. Accordingly, there has been widely adopted a construction in which a thin planar coupling plate is provided between the leading end of the arm A and a base end of the support spring, and the movable member is coupled with the support spring through this coupling plate.

On the other hand, the conventional magnetic disk drive adopts a system of carrying out the positioning of a plurality of heads H on the disk generally by means of a single servo positioning head (dedicated servo system). According to this system, one surface of the magnetic disks is used as a servo surface on which servo signals are recorded, and a head opposed to this servo surface is used as a servo head. Based on the reading result of the servo head, all the arms A are actuated by the pivot motor SM and the pairs of heads H mounted on these arms A are moved all together.

However, this system still requires an improvement in the recording density and suffers the problem that the positions of the respective data heads (all the heads excluding the servo positioning head) are shifted. Specifically, the relative positions of the heads are displaced minutely (on the order of 1am) due to the heat generated in the disk drive and a change in the ambient temperature, and thereby the recording/reproducing heads are positioned off the signal tracks designated by the servo positioning head (thermal off-track). Thus, in the worst case, an error occurs in reading and writing the signals. This problem may occur when optical disk drives start using a plurality of heads in the future.

As a system to solve the above problem, a magnetic disk drive of the sector servo system has been proposed and put into practice. According to this sector servo system, the servo signals are recorded on a part of each of the recording surfaces other than the servo surface and are read by the data head to thereby correct the displacement of the data head in accordance with the read servo signal.

However, the conventional magnetic head support mechanism ASSY does not include a means for moving a plurality of heads individually. Thus, the displacement of the data head is obliged to be corrected by controlling the power applied to the actuator HA. An amount of displacement to be corrected is about several μm at this time, and it is difficult to move the head by this small amount accurately by controlling the power application. Therefore, the conventional magnetic head supporting mechanism could not meet the recent requirements of high density recording.

Further, in the case where the writing or reading operation is carried out while switching a plurality of data heads sequentially in a data region allotted by the cylinder, the position of the data head needs to be corrected each time the data head is switched and a continuous writing or reading operation cannot be carried out. This necessitates a waiting time of about 10 to 15 ms necessary for a turn of the recording disk until the target sector comes again, thereby lowering throughput.

There is also known a mechanism for minute movement of a head in which the arm A is constructed as a pair of arms symmetrical with respect to an axis thereof; heating wires are embedded in the respective arms; and the arms are expanded and contracted individually by applying the power to these heating wires to thereby finely adjust the positions of the heads mounted at leading ends of the arms (U.S. Pat. No. 4,814,908). Since the arms are heated by the power applied to the heating wires, and are elongated by the thermal expansion, this mechanism has the critical problem that there exists a considerable delay until the heads are actually moved after the power application, and accordingly is not practical.

DISCLOSURE OF THE INVENTION

The present invention is made based on these problems residing in the prior art, and an object thereof is to provide a mechanism for minute movement of a head which is capable of minutely changing the position of each data head mounted at a leading end of a head supporting mechanism with a radial direction of a disk independently of an operation of an actuator with a simple construction, to thereby very accurately and responsively correct the position of the head in response to a thermal off-track condition.

In order to accomplish the above object, the invention is directed to a mechanism for minute movement of a head provided at a part of a head actuator which moves a head for writing and reading information on and from a recording disk in a radial direction of the recording disk so as to position the head at a desired recording track on the recording disk, and which is capable of moving the head by only a small distance independently of an operation of the head actuator. This mechanism for minute movement of a head is provided with expansion regions which are arranged and separated in a part of the head actuator, expansion members which are fixed on both or either of front and rear surfaces of the expansion regions and cause the expansion regions to expand or contract by the deformation thereof generated according to application of the power, a fixed region which is provided continuously with an end of the expansion regions in an expanding direction thereof and is not displaced according to the expansion or contraction of the expansion regions, a movable region which is provided continuously with the other end of the expansion regions in the expanding direction thereof and is displaced according to the expansion or contraction of the expansion regions, and at least one hinge portion which is formed between the fixed region and the movable region or between the movable region and the expansion regions and displaces the movable region smoothly in a moving plane of the head.

This mechanism for minute movement of a head may include the following additional features: the expansion means may be deformed in a direction substantially orthogonal to a line segment connected between the lateral end of the expansion region at the side of the movable region and the hinge portion; a rectilinear distance between the lateral end of the expansion region at the side of the movable region and the hinge portion may be set shorter than a rectilinear distance between the head and the hinge portion; the fixed region, the movable region, and the expansion region may be separated from one another by a clearance such as an oblong hole open to front and rear surfaces of these regions; the expansion region may be formed by thinning a region between the fixed region and the movable region; the expansion means on the front and rear surfaces of the expansion region may be arranged symmetrically with respect to a center line in the thickness of the expansion regions; a pair or a plurality of pairs of expansion regions and expansion means may be arranged in parallel with a moving direction of the head; the pair or the plurality of expansion means may be deformed in opposite directions simultaneously; the expansion means may be piezoelectric elements or heating wires; and the expansion region may be used as a common electrode for the piezoelectric elements.

As a result, according to the invention, a relatively small positional change of the head can be corrected even in the presence of the heat generated in the disk drive and a change in the ambient temperature. Accordingly, an error is prevented from occurring in the writing and reading operations.

[BRIEF DESCRIPTION OF THE DRAWINGS]

FIG. 14 is a plan view of a coupling plate showing a construction of a fourth embodiment of the invention;

[BEST MODES FOR EMBODYING THE INVENTION]

Hereafter, modes of the invention will be described with respect to respective embodiments referring to the accompanying drawings.

(First Embodiment)

Figure 1:
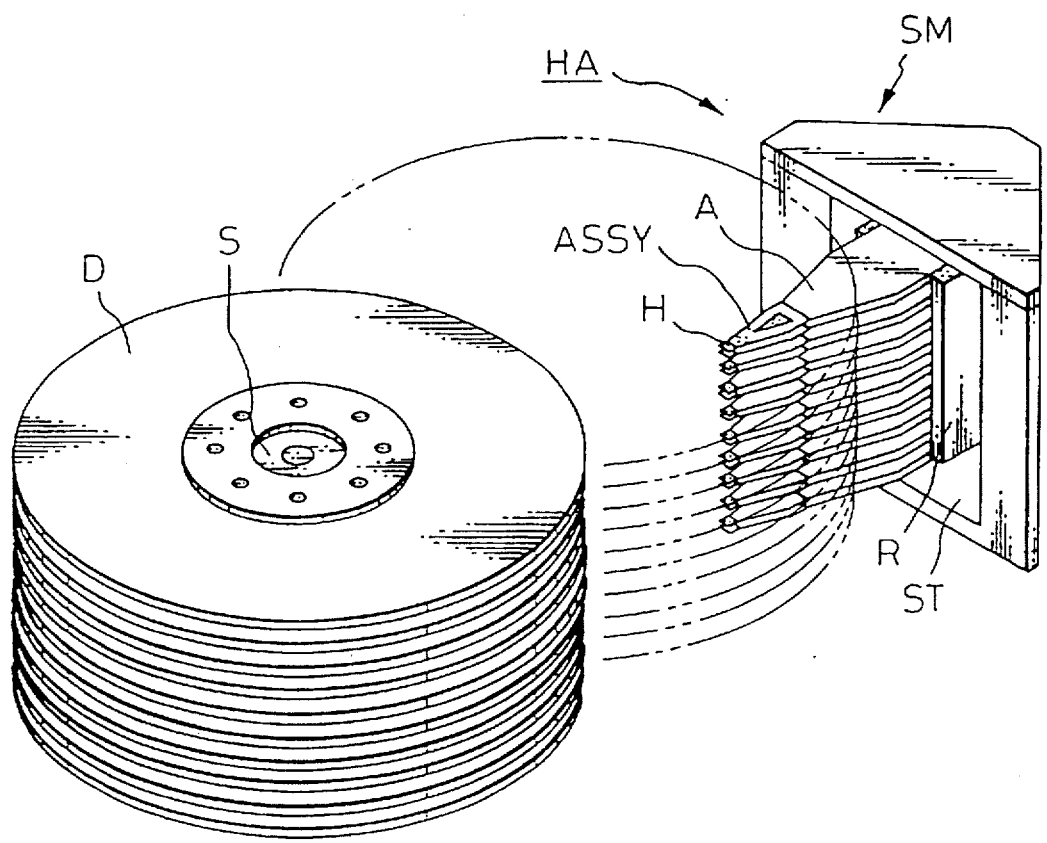
FIG. 1 is an assembled perspective view showing a construction of a conventional hard disk drive provided with a head moving mechanism.
Figure 2:
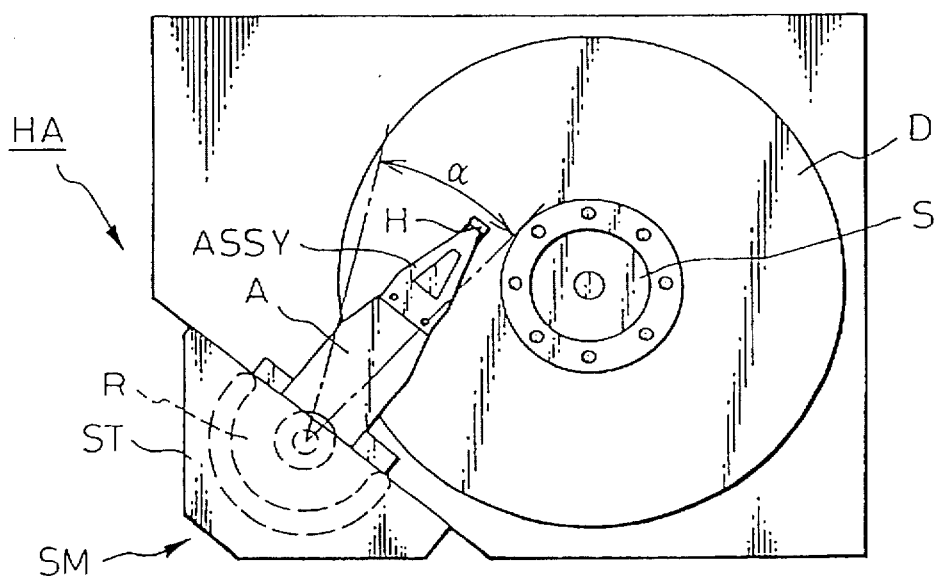
FIG. 2 is a plan view of an exemplary hard disk drive of the prior art.
Figure 3:
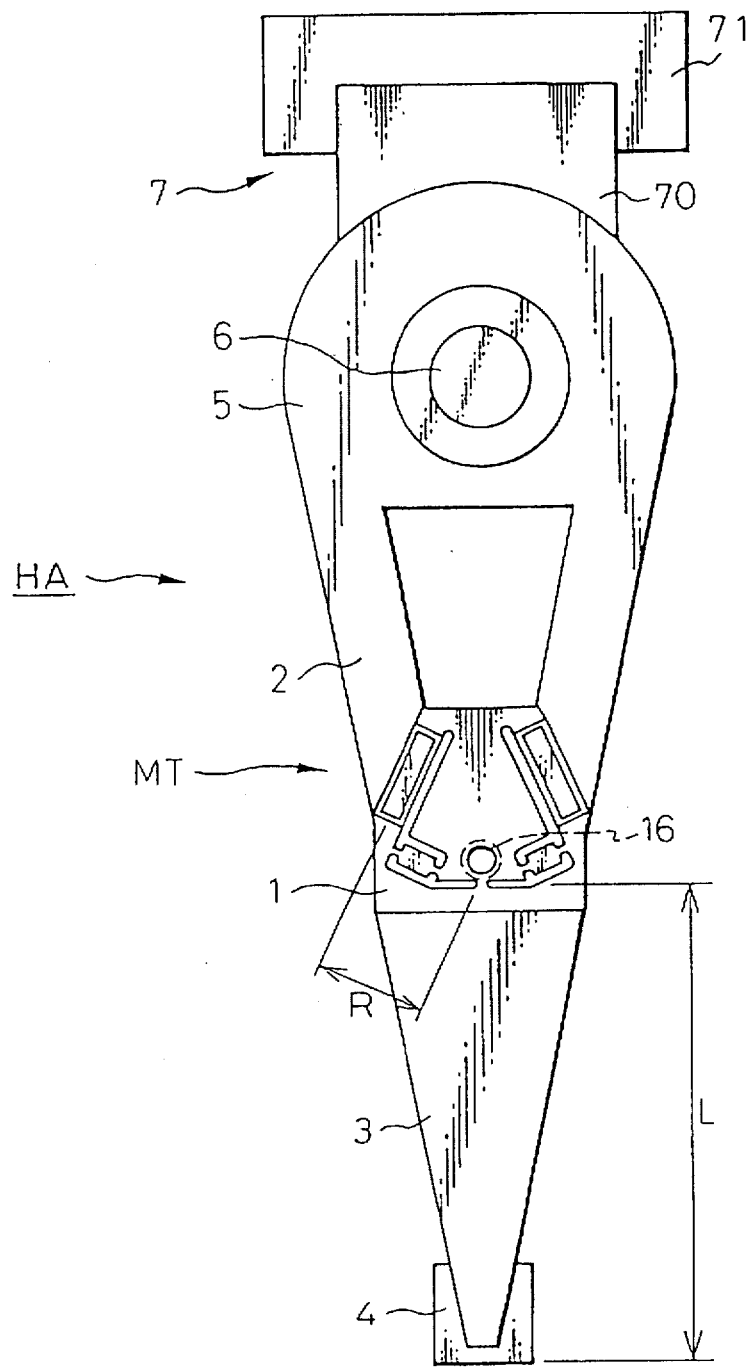
FIG. 3 is a plan view of a head actuator provided with a mechanism for minute movement of a head according to the invention.

FIG. 3 is a plan view showing a pivotal in-line type head actuator HA provided with a mechanism for minute movement of a head MT according to the invention. In FIG. 3, indicated at 2 is an access arm serving as a movable member. The access arm 2 extends from one end of a carriage 5 rotatably mounted on a supporting shaft 6. At the other end of the carriage 5 is provided a drive coil 70 and a magnetic circuit 71 as a drive means 7 for the carriage 5. The drive means 7 causes the movable member 2 to pivot within a specified angle range about the supporting shaft 6.

At a leading end of the access arm 2 is mounted a support spring 3 through a coupling plate 1. A head 4 is fixed to a leading end of the support spring 3. The head 4 moves over a recording surface (not illustrated) of a recording disk in a radial direction thereof as the access arm 2 pivots. The support spring 3 is a thin plate spring of the thickness of about 65 to 85 µm, biases the head 4 pivotally supported at a leading end thereof toward the recording surface by a spring force thereof, and holds the head 4 stably above the recording surface away therefrom by a small distance. A base end of the support spring 3 is fixed to the coupling plate 1 by means of spot welding.

On the other hand, the coupling plate 1 has a projection 16 for fixation formed at a substantially center position thereof, and is a flat stainless plate of the thickness of about 200 to 300 µm. Since it is difficult to fix the very thin support spring 3 directly to the thick access arm 2 as described above, the coupling plate 1 has been widely used as a coupling member for the access arm 2 and the support spring 3.

Figure 4A:
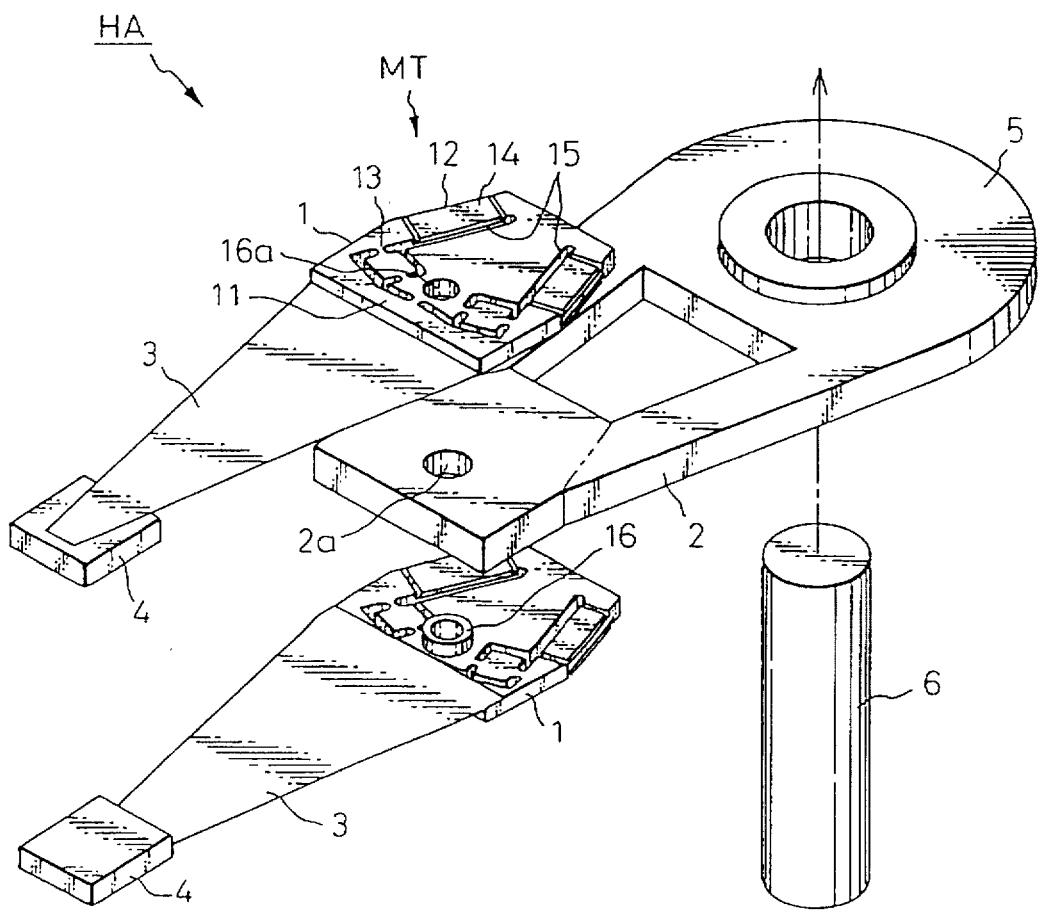
FIG. 4A is an exploded perspective view showing a construction of the head actuator of FIG. 3.

FIG. 4A shows the pivotal in-line type head actuator HA provided with the mechanism for minute movement of a head MT according to the invention shown in FIG. 3 in an exploded view. A plurality of carriages 5 are rotatably mounted on the supporting shaft 6, and two heads 4 are normally mounted on the access arm 2 projecting from each carriage 5 through the coupling plates 1 and the support springs 3.

Figure 4B:
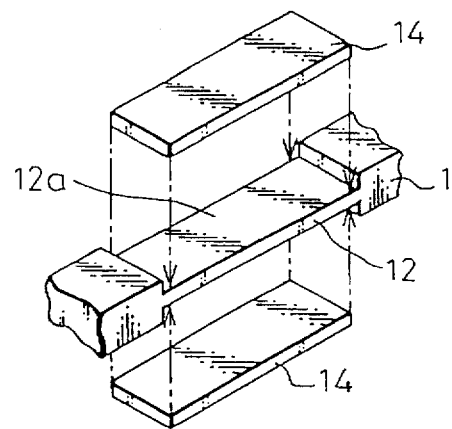
FIG. 4B is an exploded perspective view showing an expansion region in FIG. 4A.

The coupling plate 1 is fixed to the access arm 2 by fitting the projection 16 formed at a rear surface of the coupling plate 1 in a hole 2a defined in the access arm 2 and applying adhesive or the like to the fitted portion. On the coupling plate 1 are formed a fixed region, a movable region 11, expansion regions 12, hinge portions 13, and clearances 15. As shown in FIG. 4B, a recessed portion 12a is defined in each of front and rear surfaces of the expansion region 12, and has a piezoelectric element 14 which serves as an expansion means fixed therein.

Figure 5:
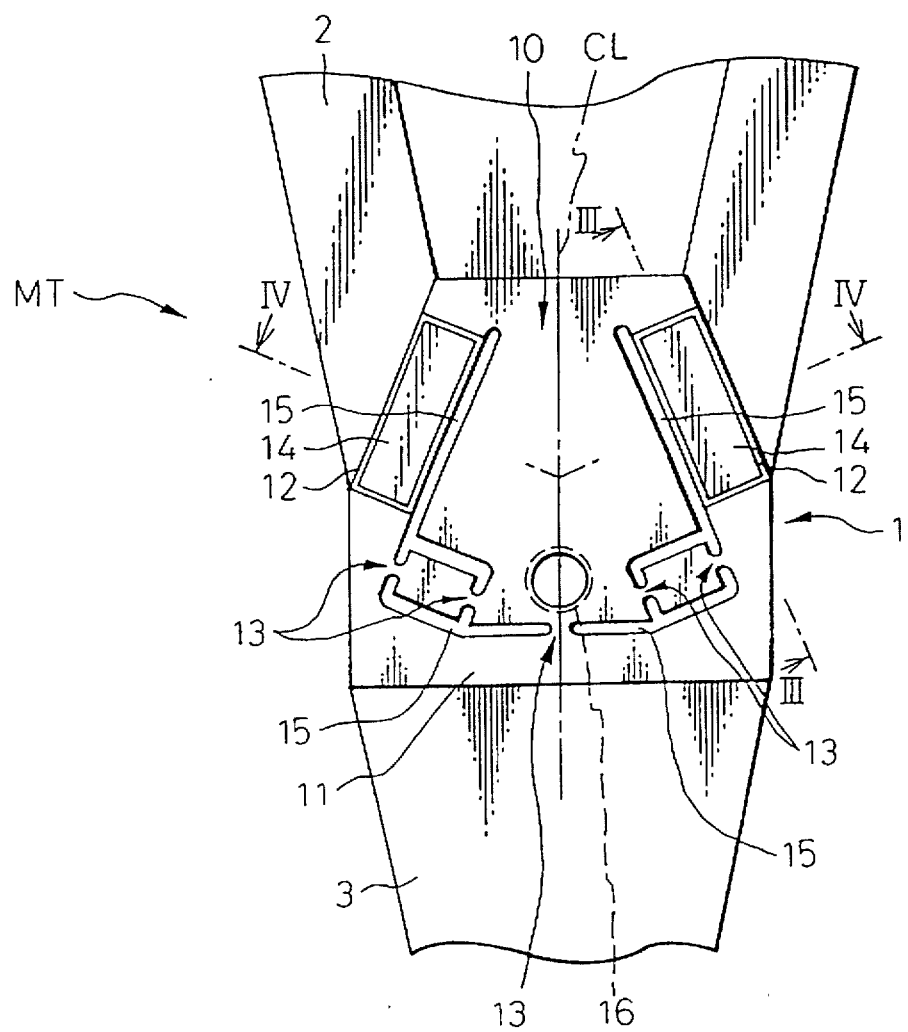
FIG. 5 is an enlarged plan view showing in detail an essential construction of the head actuator of FIG. 3.

FIG. 5 shows an enlarged portion of the coupling plate 1 wherein the mechanism for minute movement of a head MT shown in FIG. 3 is mounted. Indicated at 2 is an access arm, at 3 a support spring, at 10 a fixed region, at 11 a movable region, at 12 expansion regions, at 13 hinge portions, at 14 piezoelectric elements which serve as expansion means, at 15 clearances, and at 16 a projection for fixing the coupling plate to the access arm 2. The fixed region 10 is fixed to the leading end of the access arm 2 and the movable region 11 is fixed to the base of the support spring 3 respectively, and each expansion region 12 is provided between the fixed region 10 and movable region 11.

The coupling plate 1 is symmetrical with respect to a center line CL passing through the projection 16. A plurality of narrow clearances 15 open to the front and rear surfaces of the coupling plate 1 are also arranged symmetrically with respect to the center line CL. A first pair of clearances 15 are arranged in parallel with the expansion regions 12, and have portions thereof at the side of the support spring 3 branched into two parts. A second pair of clearances 15 are arranged on the movable regions 1, and includes a portion opposed to the branched parts of the aforementioned first pair of clearances and a portion in parallel with a boundary between the coupling plate 1 and the support spring 3. Two hinge portions 13 are formed at portions of the coupling plate 1 where the first and second pairs of clearances 15 are opposed to each other. The hinge portion 13 is formed at a portion between the ends of the second pair of clearances 15 which are opposed to each other across the center line CL.

In this embodiment, the fixed region 10 is separated from the expansion regions 12 by the first pair of clearances 15, and are separated from the movable region 11 by the second pair of clearances 15. Four hinge portions 13 are formed symmetrically with respect to the center line CL plus another hinge portion 13 located on the center line CL. The hinge portion 13 located on the center line CL functions as a rotation hinge. The movable region 11 is rotatable relative to the fixed region 10 about the center hinge portion 13 according to the deformation of the center hinge portion 13 occurring on the surface of the coupling plate 1. The other four hinge portions 13 located at opposite sides of the center line CL are different from the center hinge portion 13 and function to absorb the change in the relative positions of the fixed region 10 and the movable region 11 resulting from the rotation of the movable region 11 relative to the fixed region 10 by in-plane torsional deformations (to be described later) generated in opposite directions.

Figure 6:
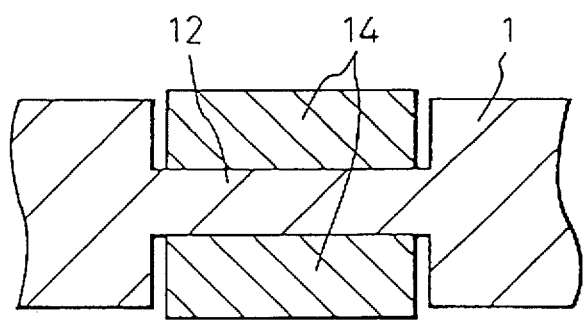
FIG. 6 is an enlarged horizontal sectional view taken along the line III—III in FIG. 5.

FIG. 6 is an enlarged horizontal sectional view taken along the line III—III in FIG. 5, and FIG. 7 is an enlarged horizontal sectional view taken along the line IV—IV in FIG. 5. In these figures, an enlargement ratio of a dimension representing the thickness is made larger deliberately in order to facilitate the understanding of the construction. As shown in these figures, the expansion regions 12 are formed by making parts of the coupling plate 1 thinner than the other parts thereof, i.e., the fixed region 10 and the movable region 11. The expansion regions 12 are easily expandable and contractible in the plane of the coupling plate 1 when even a small external force acts thereon. At the front and rear surfaces of the expansion regions 12 are fixed the piezoelectric elements 14 which serve as an expansion means in such a manner that opposite ends of the elements 14 are opposed to the boundaries between the fixed region 10 and the expansion regions 12 and between the movable region 11 and the expansion regions.

The thickness relationship between the coupling plate 1 and the piezoelectric elements 14 as the expansion means is not limited to the one shown in these figures. It is of course possible to make the total thickness of the coupling plate 1 having the piezoelectric elements 14 provided at the front and rear surfaces thereof smaller than the thickness of the fixed region 10.

The thin expansion regions 12 may be formed, together with the clearances 15, by means of etching from the front and rear surfaces of the coupling plate 1 or by press working. However, it is not necessarily required to make the expansion regions 12 thin since the coupling plate 1 is itself formed of a thin plate member of the thickness of 200 to 300 μm.

In this embodiment, there is shown an example in which the piezoelectric elements 14 are used as the expansion means. Any element such as a heating wire may be used as the expansion means 14 provided that it is expandable and contractible upon the application of power. Although the expansion means are fixed to the front and rear surfaces of each expansion region 12 in such a manner as to be symmetrical with respect to the center line in the thickness direction of the coupling plate 1 in this embodiment, the expansion means 14 may be fixed to only one surface of each expansion region 12. Further, a direct adhesion by the bonding, welding, metalization, sputtering, deposition, or the like may be adopted as a method of fixing the expansion means 14.

The piezoelectric element 14 expands and contracts in a direction normal to a line segment connecting a lateral edge thereof at the side of the movable region 11 and the center hinge portion 13. As is clear from FIG. 3, a rectilinear distance R between the piezoelectric element 14 and the center hinge portion 13 is set smaller than a rectilinear distance between the hinge portion 13 and the head 4.

The piezoelectric elements 14 arranged symmetrical with respect to the center line CL are preferably deformed in opposite directions simultaneously. The piezoelectric elements 14 are polarized in the thickness direction by a voltage which produces an electric field in excess of a coercive electric field in directions indicated by arrows in FIG. 7A, and are grounded using the coupling plate 1 as a common electrode. When different potentials are applied to the outer surfaces of the two piezoelectric elements 14 from power supplies 8, 8', the piezoelectric element 14 having the power applied from the power supply 8 expands in the longitudinal direction due to the electric field acting in the direction opposite to the polarizing direction. On the contrary, the one having the power applied from the power supply 8' contracts in the longitudinal direction due to the electric field acting in the same direction as the polarizing direction. At this time, the intensity of the electric field acting in the direction opposite to the polarizing direction is sufficiently smaller than that of the coercive electric field.

Figure 7A:
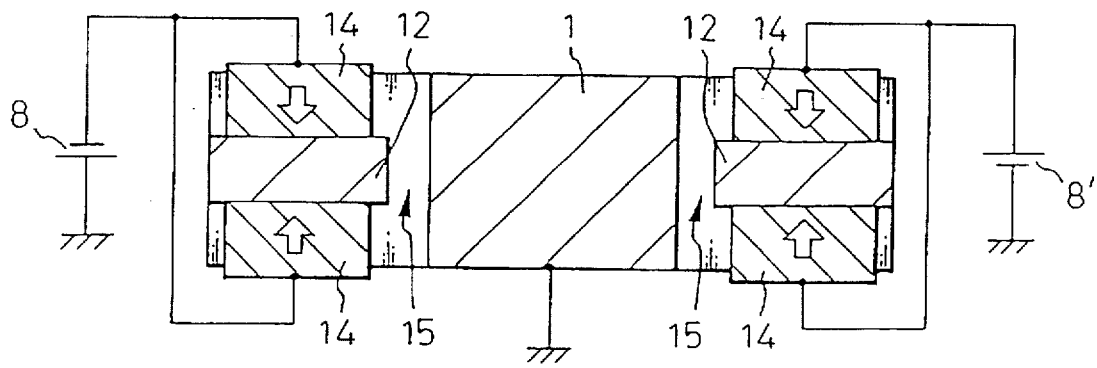
FIG. 7A is an enlarged horizontal sectional view taken along the line IV—IV in FIG. 5, showing an exemplary connection of a piezoelectric elements to a power source.
Figure 7B:
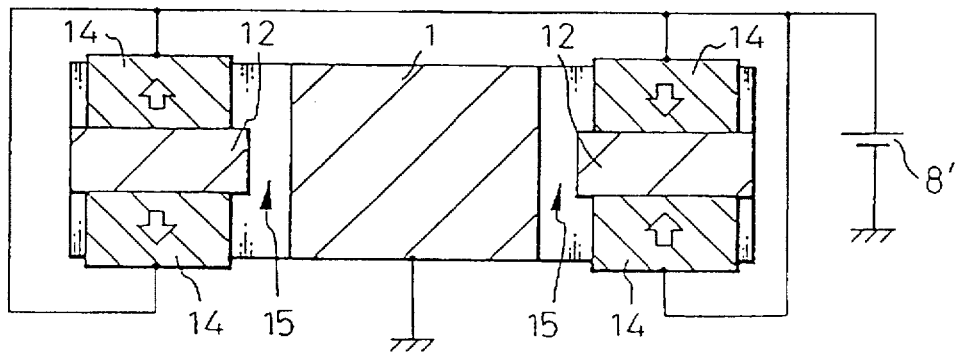
FIG. 7B is an enlarged horizontal sectional view taken along the line IV—IV in FIG. 5, showing another exemplary connection of the piezoelectric elements to the power source.

FIG. 7B shows a construction when the same potential is applied from the power supply 8' to the outer surfaces of the two piezoelectric elements 14. In this case, the piezoelectric elements 14 are polarized in the thickness direction by a voltage which produces an electric field greater than the coercive electric field in directions indicated by arrows, and are grounded using the coupling plate 1 as a common electrode similarly to the above case. When the same potential is applied from the power supply 8' to the outer surfaces of the two piezoelectric elements 14, the piezoelectric element 14 at the left side of this figure expands in the longitudinal direction due to the electric field acting in the direction opposite to the polarizing direction while the one at the right side contracts in the longitudinal direction due to the electric field acting in the same direction as the polarizing direction. Accordingly, this construction operates identically to the construction shown in FIG. 7A.

Although the direct-current power supplies 8, 8' are shown in FIGS. 7A and 7B in order to explain the expansion and contraction principle of the piezoelectric elements 14, the voltages are applied dynamically through an operational amplifier or the like according to the amount of head deviation.

Figure 7C:
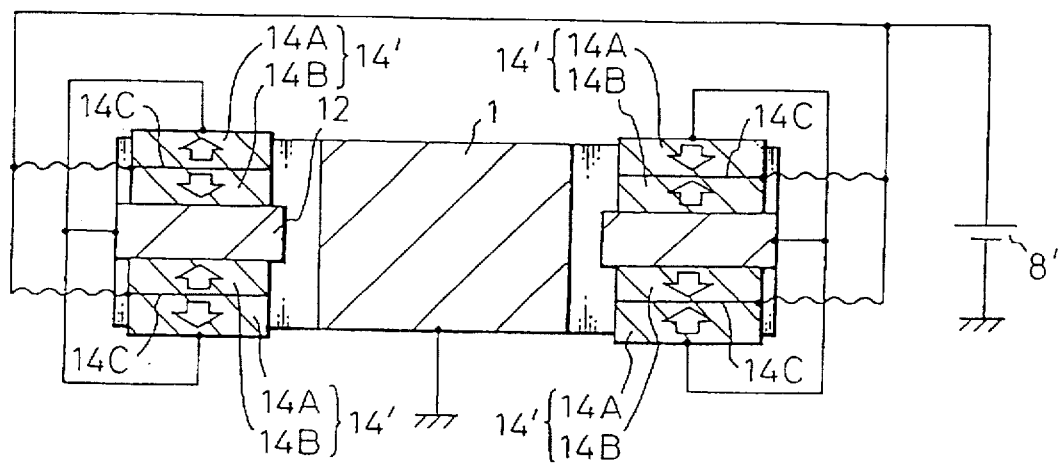
FIG. 7C is an enlarged horizontal sectional view taken along the line IV—IV in FIG. 5, showing an exemplary connection of the piezoelectric elements to the power source in the case of a multilayer piezoelectric elements.

FIG. 7C shows an example in the case where a multilayer piezoelectric element 14' including piezoelectric elements 14A, 14B is provided on each of the front and rear surfaces of the expansion region 12. In this case, a common electrode 14C is provided between the piezoelectric elements 14A and 14B and is connected to the power supply 8'. The outer surfaces of the piezoelectric elements 14A are connected to the expansion regions 12 to be grounded. The multilayer piezoelectric element 14' may be formed by laminating one over the other two (a multiple of) piezoelectric elements 14 having the thickness thereof reduced to about 50 μm, or by laminating the piezoelectric elements 14 one over another within a permissible range of dimension leaving the thickness of the elements 14 as it is. According to the former method, the electric field becomes stronger to increase a force to generate a displacement, with the result that a displacement amount is increased. According to the latter method, a cross-section of the element is increased to increase the displacement generating force, with the result that the displacement amount is increased. Thus, in either case, the displacement amount per unit voltage can be increased by making the piezoelectric element 14 have multiple layers.

Figure 7D:
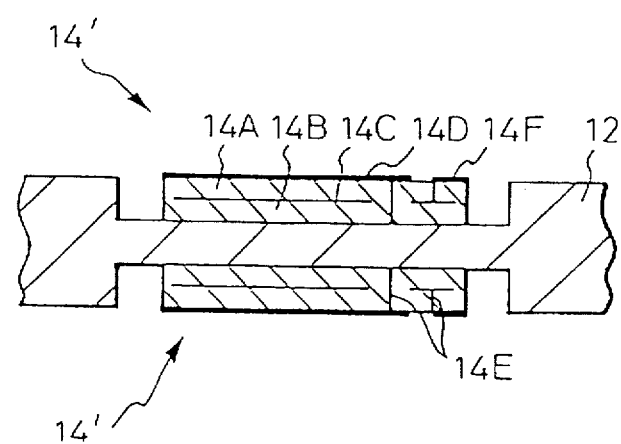
FIG. 7D is an enlarged horizontal sectional view showing an arrangement of electrodes of the multilayer piezoelectric elements of FIG. 7C.

FIG. 7D shows an example of a specific electrode arrangement in the multilayer piezoelectric element 14'. In the multilayer piezoelectric element 14' of this example, a surface electrode 14D is arranged over most of an outer surface of the piezoelectric element 14A; an external terminal 14F is arranged on the remaining outer surface of the piezoelectric element 14A; and an interior electrode 14C is arranged between the piezoelectric element 14A and 14B. The surface electrode 14D is connected through a via 14E to the expansion region 12 to be grounded, whereas the external terminal 14F is connected through the via 4E to the interior electrode 14C. Thus, a state where the external terminals 14F are connected to the power supply 8' is similar to the state shown in FIG. 7C.

The surface electrode 14D is formed of silver paste, silver deposition, silver palladium alloy, or the like. The interior electrodes 14C and the vias 14E are formed by calcining powders of silver palladium alloy with the piezoelectric element. Since a connecting method with the use of the via 14E is known in the field of multilayer ceramic printed circuit board, no further description will be given on this.

Figure 8:
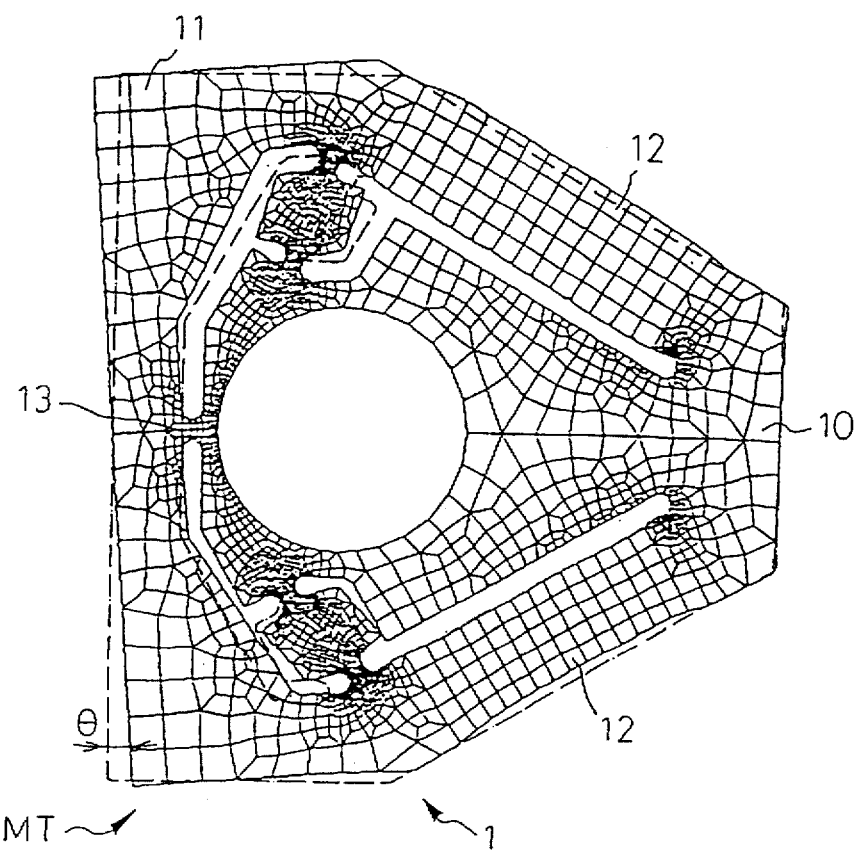
FIG. 8 is a simulation diagram, simulated by the use of a computer, showing a displaced state of a coupling plate of FIG. 5.

FIG. 8 is a diagram showing a simulation result of the operation of a thus constructed mechanism for minute movement of a head MT according to the invention. In this figure, a broken line represents a state before the operation while a solid line represents a state after the operation. A hatched portion substantially at the center represents the projection 16 to be fixed to the access arm 2.

As shown in FIG. 8, when the power is applied to the respective piezoelectric element 14 fixed on the expansion regions 12, the upper located expansion region 12 expands while the lower located one contracts. According to the expansion and contraction of the expansion regions 12, the movable region 11 rotates relative to the fixed region 10 by only a small angle θ about the center hinge portion 13 connecting the movable region 11 and the fixed region 10. According to this rotation, the head 4 at the leading end of the support spring 3 fixed to the movable region 11 is displaced a specified distance from the widthwise center of the access arm 2 fixed to the fixed region 10.

At this time, the displaced amount of the head 4 is substantially L/R times the displaced amount of the piezoelectric element 14 since the rectilinear distance R between the lateral edge of the piezoelectric element 14 at the side of the movable region 11 and the center hinge portion 13 is set smaller than the rectilinear distance between the center hinge portion 13 and the head 4. Accordingly, the small rotation angle θ is able to give the head 4 a sufficient displacement.

Figure 9:
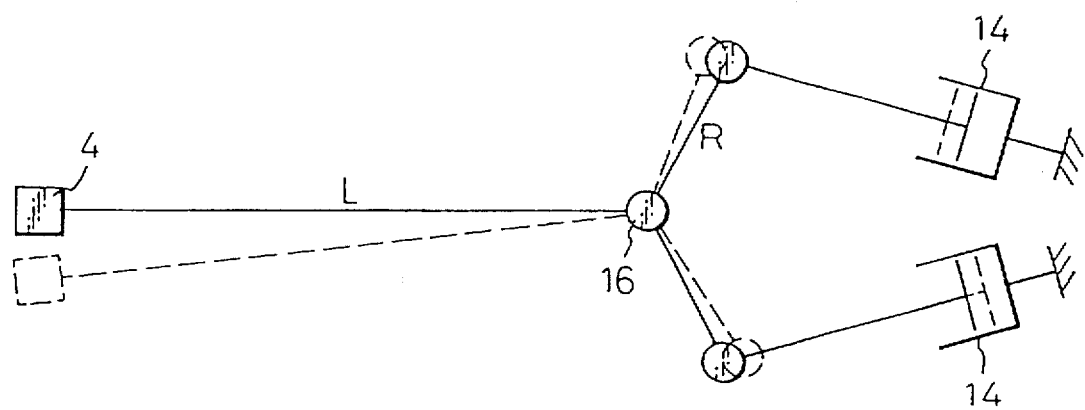
FIG. 9 is a model diagram for explaining a displacement magnification of a head mounted at a leading end of a support spring according to the displacement of the coupling plate.

This can be seen more clearly from a model diagram shown in FIG. 9. When bars mounted on the rotatable shaft 16 and having the lengths of L and R (<L) are caused to rotate about the rotatable shaft 16 by the piezoelectric elements 14, a moved amount of a leading end of the bar having the length L is substantially L/R times a moved amount of the bar having the length R. In this way, the head can be moved accurately within a small movable range through the deformation of the piezoelectric element 14 which occurs rapidly in response to the application of power.

The deformation of the piezoelectric elements 14 associated with the power application occurs very suddenly and enables the head 4 to be moved accurately within the small movable range. In the case where the heating wire is used as the expansion means 14 as well, the elongation of the heating wire and the expansion region 12 due to the thermal expansion is translated into the movement of the head 4. Since the thermal capacity of the heating wire and the expansion region 12 is small, a response time can be reduced greatly compared to a known construction in which a part of the access arm as a movable member is caused to expand thermally.

(Second Embodiment)

Figure 10:
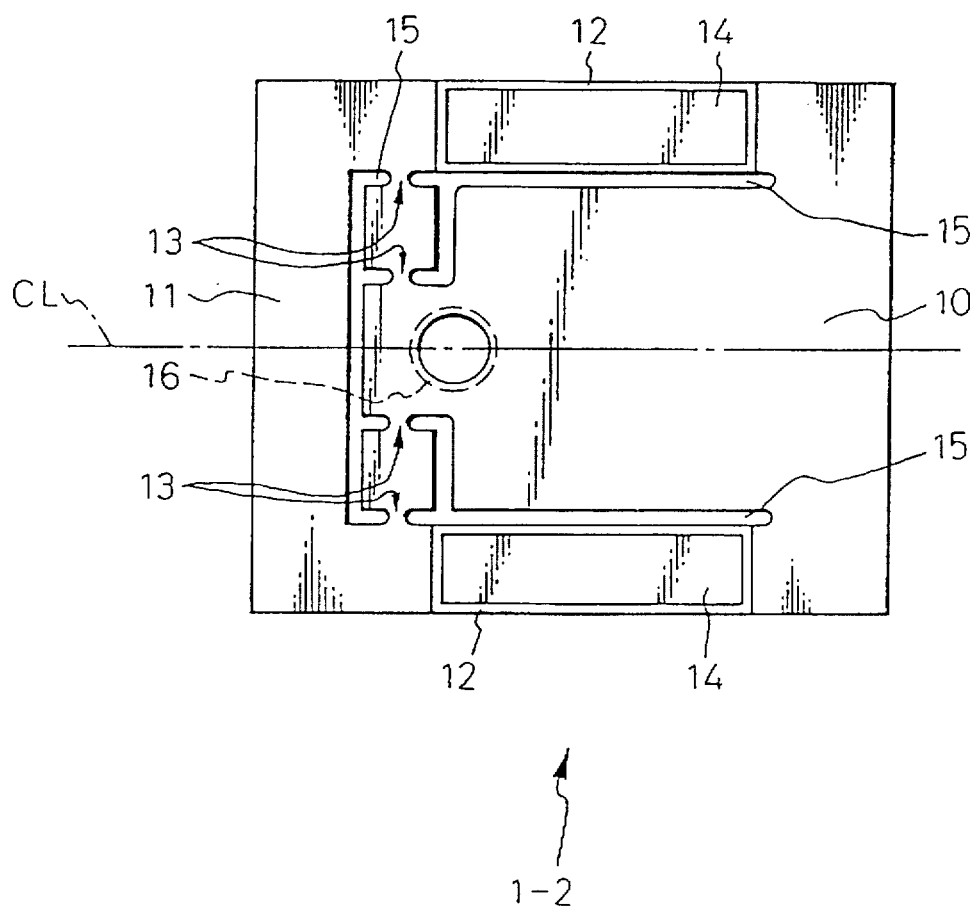
FIG. 10 is a plan view of a coupling plate showing a construction of a second embodiment of the invention.

FIG. 10 is a plan view of a coupling plate 1-2 showing a construction of a second embodiment of the invention. The coupling plate 1-2 of the embodiment shown in FIG. 10 differs from the coupling plate 1 of the first embodiment shown in FIG. 5 in that the coupling plate 1-2 is quadrilateral unlike the hexagonal coupling plate 1; that the expansion regions 12 are arranged in parallel with the lateral sides of the coupling plate 1-2; and that only a pair of hinge portions 13 are provided at each of the opposite sides of the center line CL and the hinge portion 13 located on the center line CL is omitted to thereby form a continuously extending clearance 15. Accordingly, the coupling plate 1-2 of this embodiment is so constructed that the rotation of the movable region 11 is absorbed by the torsion generated in these planes.

(Third Embodiment)

Figure 11:
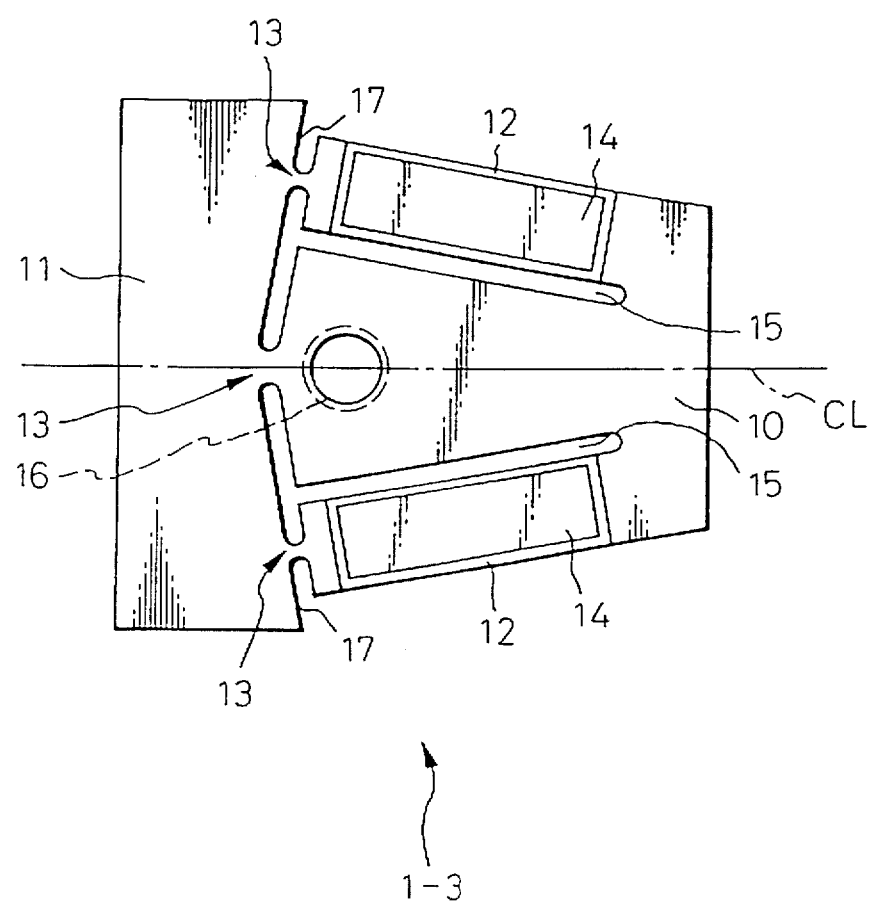
FIG. 11 is a plan view of a coupling plate showing a construction of a third embodiment of the invention.

FIG. 11 is a plan view of a coupling plate 1-3 showing a construction of a third embodiment of the invention. The coupling plate 1-3 of the embodiment shown in FIG. 11 differs from the coupling plate 1 of the first embodiment shown in FIG. 5 in that a hinge portion which functions as a rotation hinge at a widthwise center is formed on the center line CL similar to the first embodiment, but a single hinge portion 13 is provided at each of the opposite sides of the center line CL. As a result, the separated clearances 15 provided at each of the opposite sides of the center line CL are integrated into a substantially lopsided clearance, and a notch 17 is defined between an outer end of a head of the lopsided letter T and a corresponding lateral side of the coupling plate 1-3.

Figure 12:
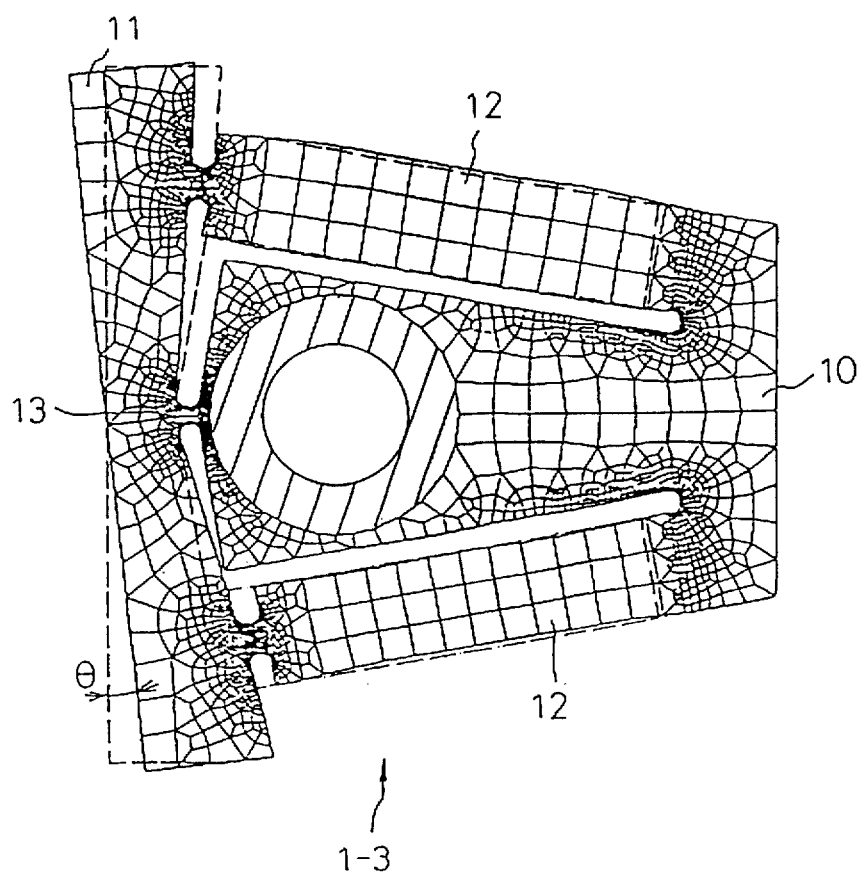
FIG. 12 is a simulation diagram, simulated by the use of a computer, showing a displaced state of the coupling plate of FIG. 11.

FIG. 12 is a diagram showing a simulation result of the operation of the coupling plate 1-3 constructed as shown in FIG. 11. In this figure, a broken line represents a state before the operation while a solid line represents a state after the operation. A hatched portion substantially at the center represents the projection 16 to be fixed to the access arm 2.

As seen from FIG. 12, the coupling plate 1-3 of the embodiment shown in FIG. 11 operates quite similar to the one shown in the first embodiment. More specifically, when the power is applied to the respective piezoelectric elements 14 fixed to the expansion regions 12, the upper located expansion region 12 expands while the lower located one 12 contracts. According to the expansion and contraction of the expansion regions 12, the movable region 11 rotates relative to the fixed region 11 by only a small angle θ about the center hinge portion 13 connecting the movable region 11 and the fixed region 11. According to this rotation, the head 4 at the leading end of the support spring 3 fixed to the movable region 11 is displaced by a specified distance from the widthwise center of the access arm 2 fixed to the fixed region 10.

At this time, the displaced amount of the head 4 is substantially L/R times the displaced amount of the piezoelectric element 14 since the rectilinear distance R between the lateral edge of the piezoelectric element 14 at the side of the movable region 11 and the center hinge portion 13 is set smaller than the rectilinear distance between the center hinge portion 13 and the head 4. Accordingly, the small rotation angle θ is able to give the head 4 a sufficient displacement.

Figure 13:
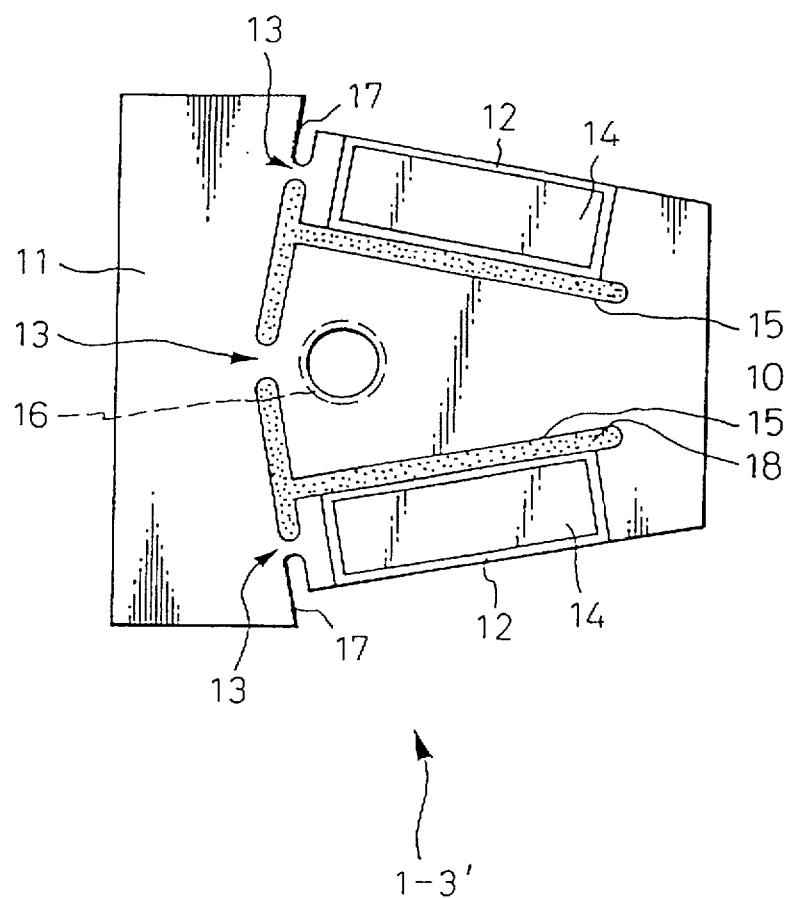
FIG. 13 is a plan view showing a modification in which a damping members are filled in clearances defined in the coupling plate of FIG. 11.

FIG. 13 shows a coupling plate 1-3' in which damping members 18 are filled in the clearances 15 of the coupling plate 1-3 shown in FIG. 11. It is appreciated that resin or like material is preferably used as the damping member 18. If the damping members 18 are filled in the clearances 15 which separate the fixed, movable, and expansion regions 10, 11, 12 from one another in this manner, the relative vibration between the respective regions can be reduced.

Since the damping effect brought about by the damping members 18 is higher against the vibrations of high frequency, the out-of-plane vibrations of the expansion and movable regions 12, 11 can be effectively damped without deterring the in-plane displacement of the expansion regions 12. As a result, an undesirable likelihood that a stable floating of the head 4 may be hindered due to the vibrations can be reduced.

(Fourth Embodiment)

FIG. 14 is a plan view of a coupling plate 1-4 showing a construction of a fourth embodiment of the invention, which is a modification of the coupling plate 1-3 of the embodiment shown in FIG. 11. The coupling plate 1-4 of the embodiment shown in FIG. 14 differs from the coupling plate 1-3 of the third embodiment shown in FIG. 11 only in that the coupling plate 1-4 is quadrilateral unlike the hexagonal coupling plate 1-3 and that the expansion regions 12 are arranged in parallel with the lateral sides of the coupling plate 1-4.

(Fifth Embodiment)

Figure 15A:
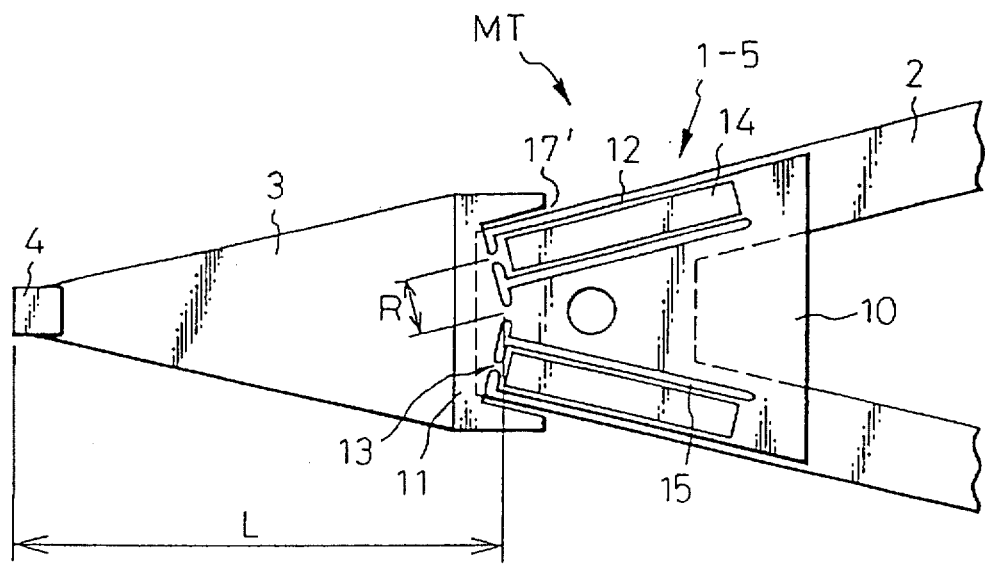
FIG. 15A is a plan view of a leading end of a head supporting mechanism showing a construction of a fifth embodiment of the invention.
Figure 15B:
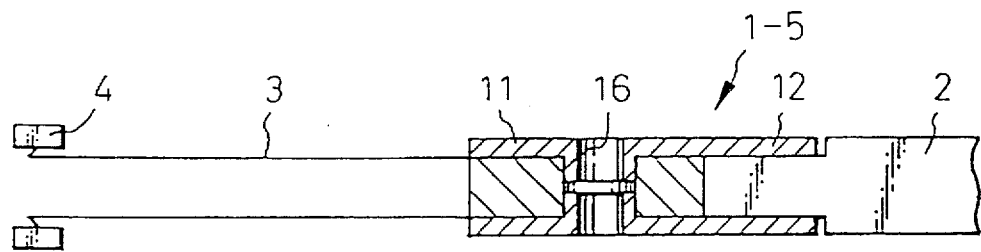
FIG. 15B is a side view in section showing the head supporting mechanism of FIG. 15A.

FIG. 15A is a plan view of a leading end portion of a head supporting mechanism showing a construction of a fifth embodiment of the invention. Specifically, 15A shows a state where a coupling plate 1-5 modified from the coupling plate 1-3 of the embodiment shown in FIG. 11 is mounted on an access arm 2. FIG. 15B is a side view in section of the head supporting mechanism of FIG. 15A. The access arm 2 of this embodiment has at each of both surfaces thereof a support spring 3 for supporting a head 4 through the coupling plate 1-5. The coupling plate 1-5 of the embodiment shown in FIG. 15A differs from the coupling plate 1-3 of the third embodiment shown in FIG. 11 in that each expansion region 12 arranged on the coupling plate extends in the same direction as the corresponding arm of the access arm 2 on which the coupling plate 1-5 is mounted and therefore each expansion region 12 overlaps with the arm.

Figure 15C:
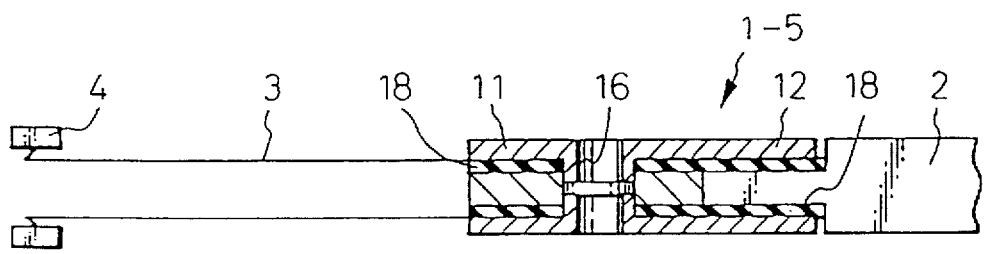
FIG. 15C is a side view in section showing the head supporting mechanism of FIG. 15A in which damping members are used.

If the expansion regions 12 on the coupling plate 1-5 overlap with the access arm 2 on which the coupling plate 1-5 is mounted in this way, the out-of-plane vibrations on the expansion regions 12 can be reduced. The out-of-plane vibrations can be further reduced by providing the damping members 18 between the expansion regions 12 and the access arm 2 as shown in FIG. 15C. Moreover, out of the values L, R for determining the enlargement ratio of displacement L/R, the value R can be made smaller. Accordingly, the enlargement ratio of displacement can be increased by about 50% from the aforementioned value of 7 to 8 times to 11 to 12 times.

(Sixth Embodiment)

Figure 16A:
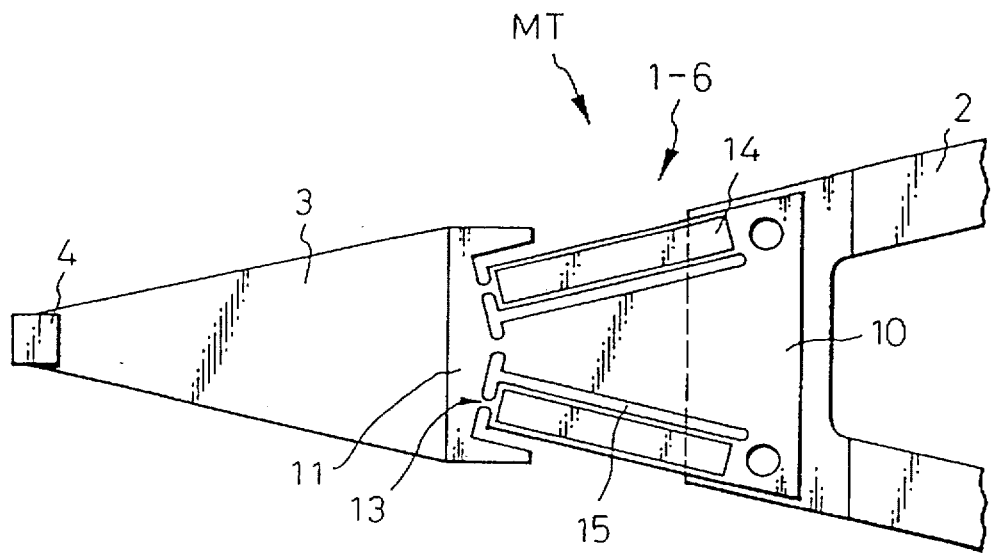
FIG. 16A is a plan view of a leading end of a head supporting mechanism showing a construction of a sixth embodiment of the invention.
Figure 16B:
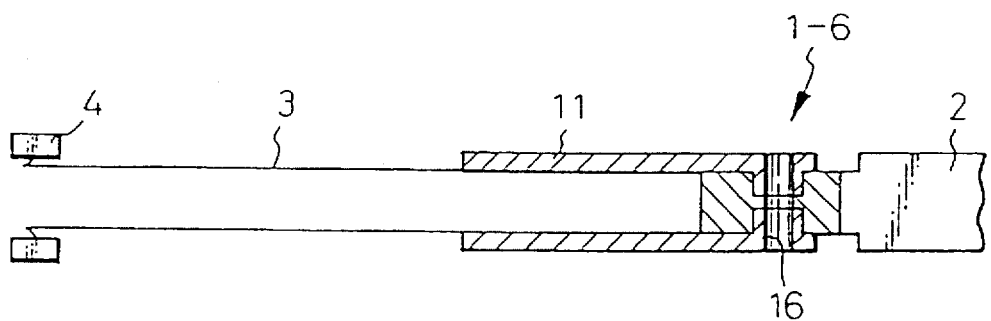
FIG. 16B is a side view in section showing the head supporting mechanism of FIG. 16A.
Figure 16C:
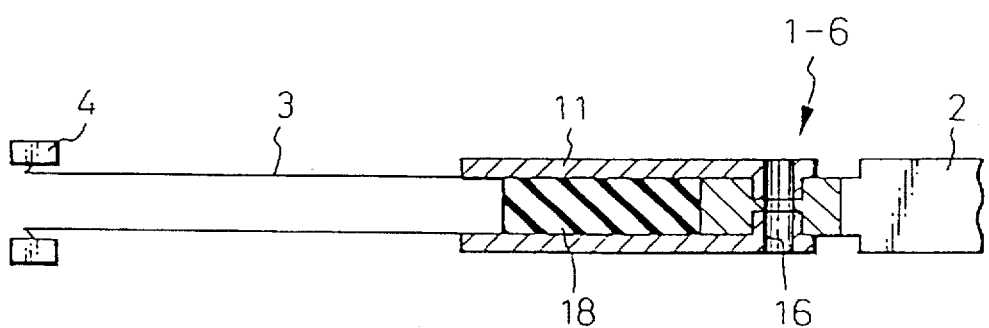
FIG. 16C is a side view in section showing the head supporting mechanism of FIG. 16A in which damping members are used.

FIG. 16A is a plan view of a leading end portion of a head supporting mechanism showing a construction of a sixth embodiment of the invention. Specifically, FIG. 16A shows a coupling plate 1-6 which is mounted on the access arm 2 differently from the coupling plate 1-5 of the embodiment shown in FIG. 15A. FIG. 16B is a side view in section of the head supporting mechanism of FIG. 16A. In the sixth embodiment, the coupling plate 1-6 is fixed to the access arm 2 at two points located at a rear end portion thereof. This embodiment is advantageous in reducing mass and moment of inertia of a movable portion of the entire head actuator HA since the length of the arm 2 can be shortened. Further, the out-of-plane vibrations can be reduced by providing a damping member 18 between the coupling plates 1-6 mounted on the front and rear surfaces of the access arm 2 as shown in FIG. 16C. As a result, out of the values L, R for determining the enlargement ratio of displacement L/R, the value R can be made smaller in this embodiment similar to the embodiment shown in FIGS. 15A to 15C. Accordingly, the enlargement ratio of displacement can be increased by about 50% from the aforementioned value of 7 to 8 times to 11 to 12 times.

(Seventh Embodiment)

Figure 17:
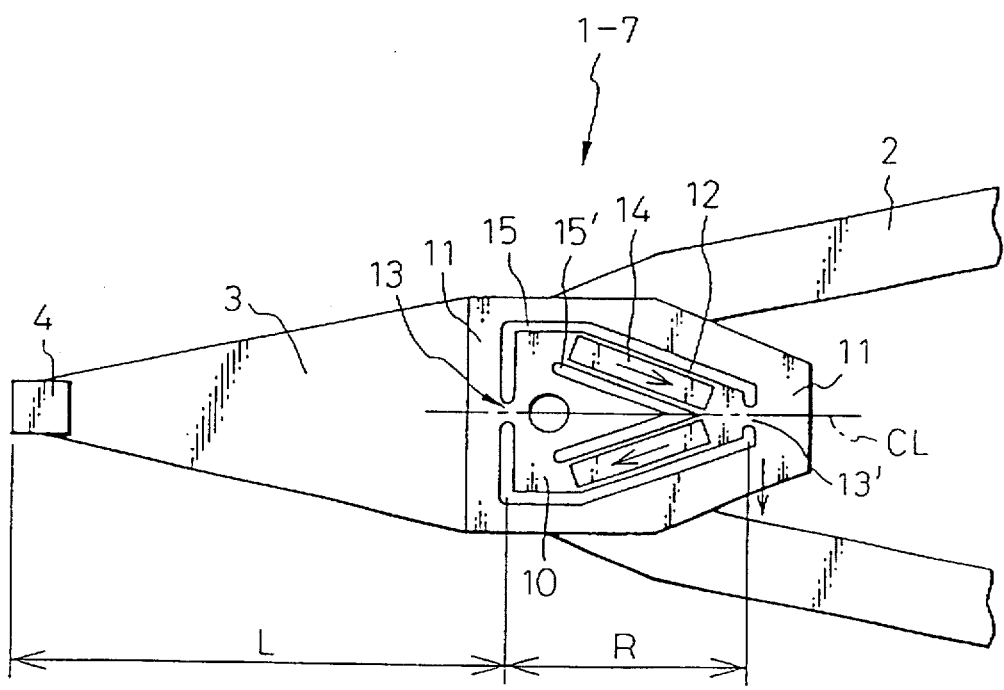
FIG. 17 is a plan view of a leading end of a head supporting mechanism showing a construction of a seventh embodiment of the invention.

FIG. 17 is a plan view of a leading end portion of a head supporting mechanism showing a construction of a seventh embodiment of the invention. Specifically, FIG. 17 shows a state where a coupling plate 1-7 having an increased enlargement ratio of displacement is mounted on the access arm 2. In this embodiment, the coupling plate 1-7 is formed into a hexagonal figure symmetrical with respect to the center line CL. The hexagonal figure includes two parallel sides opposing in the widthwise direction, two parallel sides opposing in the direction of the center line CL, and two sides whose width decreases as the side of the access arm 2. An entire peripheral portion of the coupling plate 1-7 functions as a movable region 11. Inward of the movable region 11 is defined a first clearance 15 in parallel with the periphery of the plate 1-7. At portions where the first clearance 15 intersects with the center line 15 first and second hinge portions 13, 13' are formed. In an area enclosed by the first clearance 15 is defined a V-shaped second clearance 15'. In an area located between the first and second clearances 15, 15' the expansion regions 12 are formed each provided with a piezoelectric element 14. The spacing between the two expansion regions 12 is wider at the side of the support spring 3 and narrower at the side of the access arm 2.

In this embodiment, the expansion means 14 at the opposite sides of the center line CL are caused to expand opposite in phase to each other as indicated by arrows. The expansion of these expansion regions 12 is combined at the second hinge portion 13' and accordingly an enlarged displacement is generated thereat as indicated by a downward facing arrow. The enlargement ratio of this displacement is about 4 times. In this embodiment, further, the displacement amount at the second hinge portion 13' is multiplied by L/R when a distance between the first and second hinge portions 13, 13' is R and a distance between the first hinge portion 13 and the head 4 is L. Since the value R is greater in this embodiment than in the aforementioned embodiments, a value of the displacement ratio L/R is not very large, namely about 2.5 times.

However, in this embodiment, the displacement amount of the expansion regions 12 is increased four times at the second hinge portion 13' as described above. Thus, the enlargement ratio of the displacement amount of the head 4 in response to the displacement of the expansion regions 12 is in total 4×2.5 times: about 10 times. This is greater than the aforementioned enlargement ratio of displacement of about 7 times by 30%. In this way, in the embodiment shown in FIG. 17, a large displacement is obtainable at the head position by enlarging the displacement of the piezoelectric elements 14 at two stages.

(Eighth Embodiment)

Figure 18:
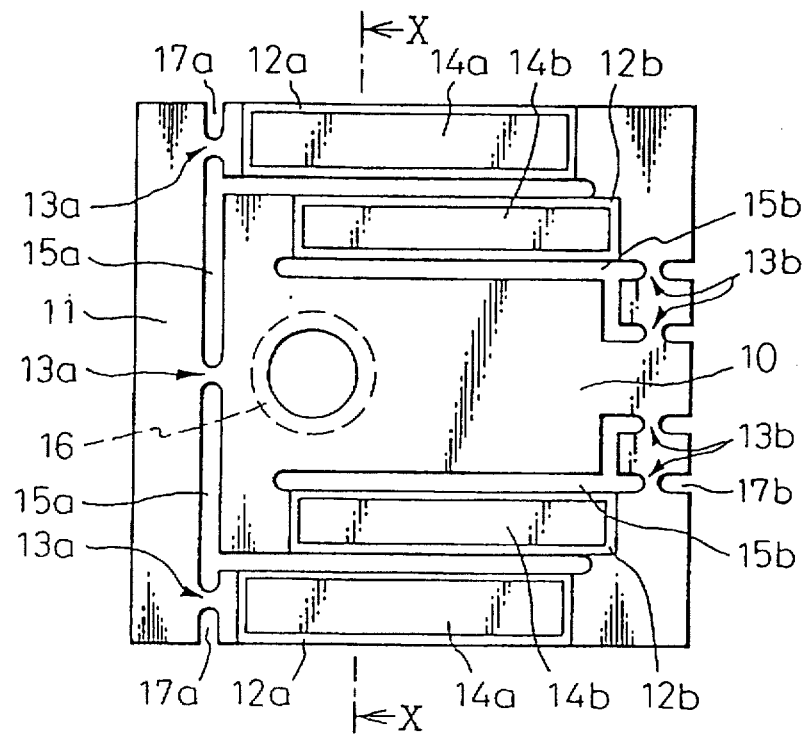
FIG. 18 is a plan view of a coupling plate showing a construction of an eighth embodiment of the invention.
Figure 19:
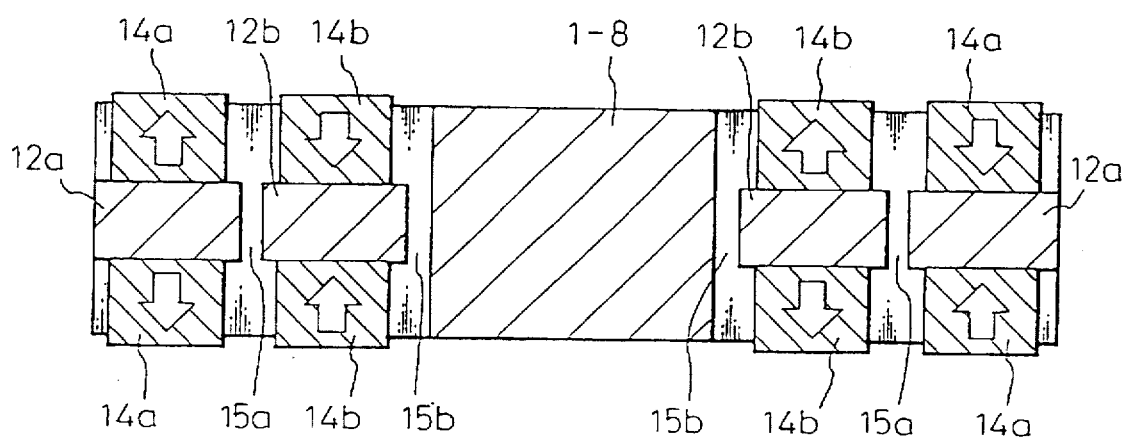
FIG. 19 is an enlarged horizontal sectional view taken along the line X—X in FIG. 18.

FIG. 18 is a plan view of a coupling plate 1-8 showing a construction of an eighth embodiment of the invention, and FIG. 19 is an enlarged horizontal sectional view taken along the line X—X in FIG. 18.

The coupling plate 1-8 in the embodiment shown in FIG. 18 is designed to increase the enlargement ratio of displacement by providing another pair of expansion regions inward of the expansion regions 12 of the coupling plate 1-4 of the fourth embodiment shown in FIG. 14. More specifically, the expansion regions 12, hinge portions 13, piezoelectric elements 14, clearances 15, and notches 17 of the coupling plate 1-4 of the fourth embodiment are first expansion regions 12a, first hinge portions 13a, first piezoelectric elements 14, first clearances 15a, and first notches 17a respectively in the coupling plate 1-8. Further, indicated at 10 is a fixed region, at 11 a movable region, and at 16 a projection.

In the coupling plate 1-8 of this embodiment, second clearances 15b are defined inward of and in parallel with the first clearances 15a; second expansion regions 12b are formed between the corresponding first and second clearances 15a, 15b; and second piezoelectric elements 14 are mounted on these second expansion regions 12b. An end portion of each second clearance 15b at the side of the fixed region 10 is branched into two parts. At an edge portion of the fixed region 10 are defined second clearances 17b respectively opposed to the corresponding branched parts of the second clearances 15b. Second hinge portions 13b are formed between the branched parts and the corresponding second clearances 17b.

As described above, the first and second expansion regions 12a, 12b are arranged in parallel with each other at each of the upper and lower sides, and one end of each expansion region 12a is connected to the movable region 11 while the other end thereof is connected to one end of the corresponding second expansion region 12b. The other end of this second expansion region 12b is connected to the fixed region 10. Accordingly, the first and second expansion regions 12a, 12b exist between the fixed region 10 and the movable region 11 with connected in series in the respective expanding directions. Thus, in this construction, the movable region 11 rotates relative to the fixed region 10 by an angle corresponding to a sum of the expansion or contraction amounts in both the expansion regions 12a and 12b, with the result that even a small degree of expansion or contraction of the respective expansion regions 12a, 12b gives the head 4 a large displacement. The expansion regions 12a, 12b need not necessarily be arranged in parallel with each other, but may be arranged linearly.

As indicated by arrows in FIG. 19, the first and second piezoelectric elements 14a, 14b are arranged such that the polarizing directions thereof are opposite to each other. Thus, when the same potential is applied to the first and second piezoelectric elements 14a, 14b using the coupling plate 1-8 as a common ground electrode, the first and second piezoelectric elements 14a, 14b are displaced in a manner similar to the one described in the first embodiment. In other words, the deforming directions of the corresponding first and second piezoelectric elements 14a, 14b located at the opposite sides in the thickness direction coincide with each other. As a result, the deforming directions of the corresponding first and second piezoelectric elements 14a, 14b at the opposite sides in the widthwise direction and of the first and second piezoelectric elements 14a, 14b adjacent to each other thereat differ from each other. Thus, when the power is applied to the first and second piezoelectric elements 14a, 14b from a common drive circuit, the movable region 11 is capable of generating a displacement corresponding to a sum of the expansion or contraction amounts in both the expansion regions 12a and 12b.

In the aforementioned first to eighth embodiments, the mechanism for minute movement of a head is formed at the coupling plates 1 to 1-8 for coupling the support spring 3 for the head 4 with the access arm 2. However, the mechanism for minute movement of a head may be formed at a part of the support spring 3, a part of the access arm 2, or a part of the access arm 2 incorporating the support spring. These embodiments will be described hereinafter.

(Ninth Embodiment)

Figure 20:
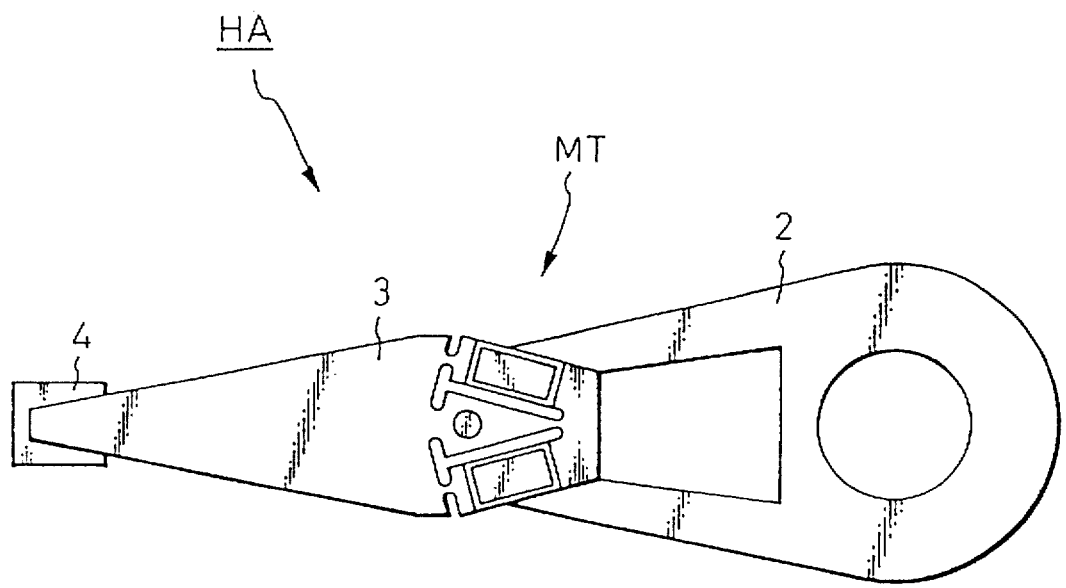
FIG. 20 is a plan view of a head actuator showing a construction of a ninth embodiment of the invention.

FIG. 20 is a plan view of a head actuator HA excluding a stator, showing a construction of a ninth embodiment of the invention. In this ninth embodiment, a mechanism for minute movement of a head MT is formed at a part of a spring 3. The mechanism for minute movement of a head MT shown in FIG. 20 is equivalent to the coupling plate 1-3 of FIG. 11 integrally formed with the support spring 3.

(Tenth Embodiment)

FIG. 21 is a plan view of a head actuator HA excluding a stator, showing a construction of a tenth embodiment of the invention. In this tenth embodiment, a mechanism for minute movement of a head MT is formed at a part of an access arm 2. The mechanism for minute movement of a head MT shown in FIG. 21 is equivalent to the coupling plate 1-4 of FIG. 14 integrally formed with the access arm 2.

Figure 21A:
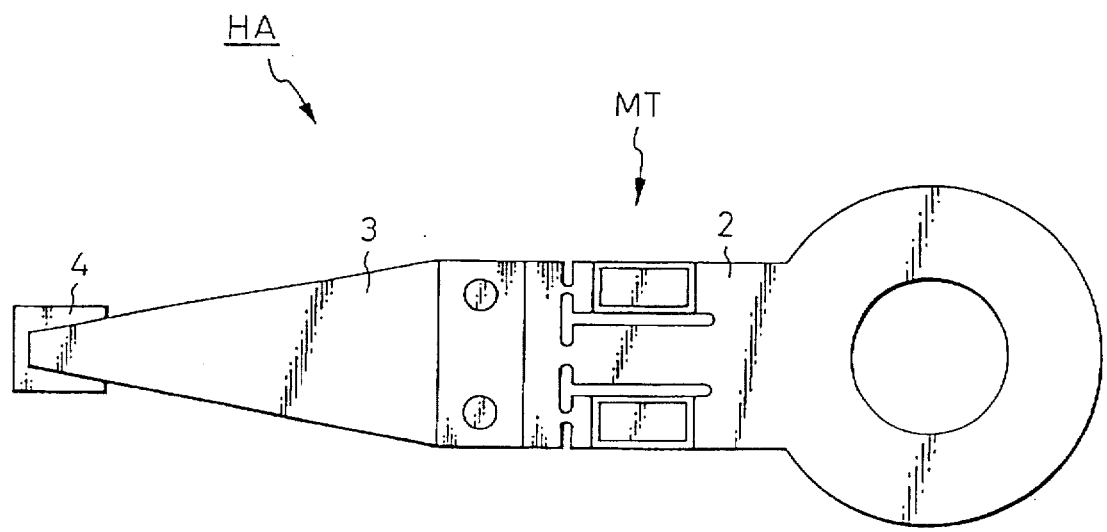
FIG. 21A is a plan view of a head actuator showing a construction of a tenth embodiment of the invention.
Figure 21B:
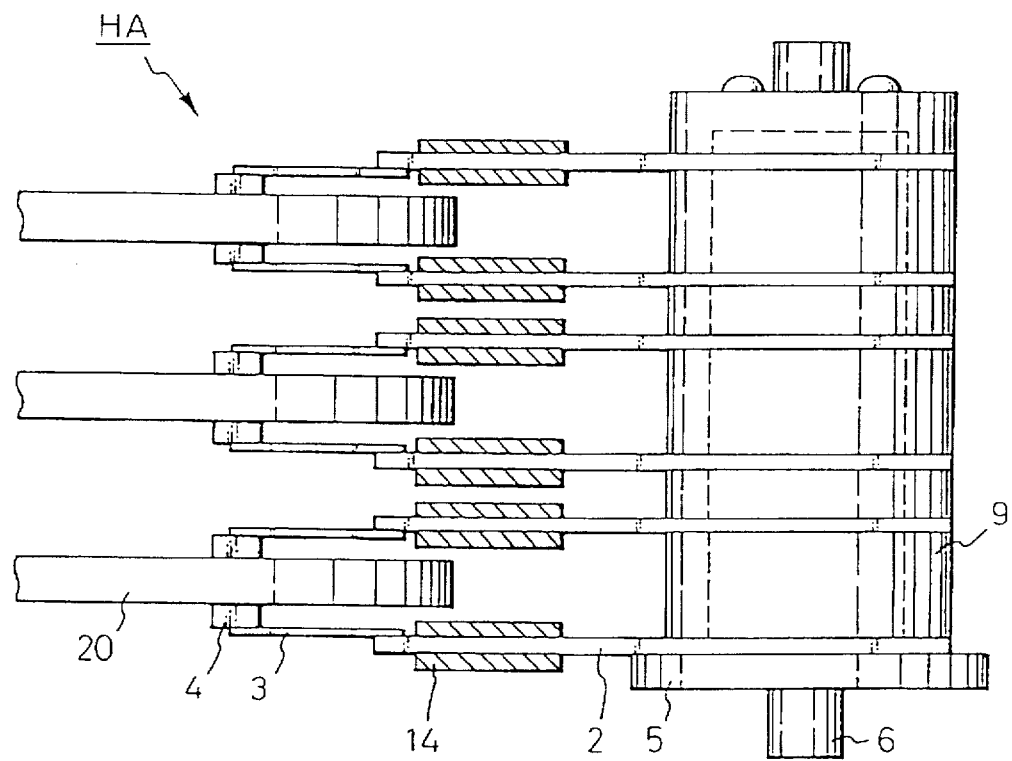
FIG. 21B is a side view showing an exemplary construction of the exemplary head actuator of FIG. 21A.

FIG. 21B is a side view showing an exemplary construction of the head actuator HA of FIG. 21A. Unlike the foregoing embodiments, a single head 4 is mounted to an access arm 2 through a support spring 3. In this example, three recording disks 20 are provided and six head supporting mechanisms are mounted on a rotatable shaft 6 through ring spacers 9 above a carriage 5. Each head supporting mechanism includes the access arm 2 with the mechanism for minute movement of a head loaded thereon, the support spring 3, and the head 4. Piezoelectric elements 14 are fixed to the mechanism for minute movement of a head MT on the access arm 2.

Figure 21C:
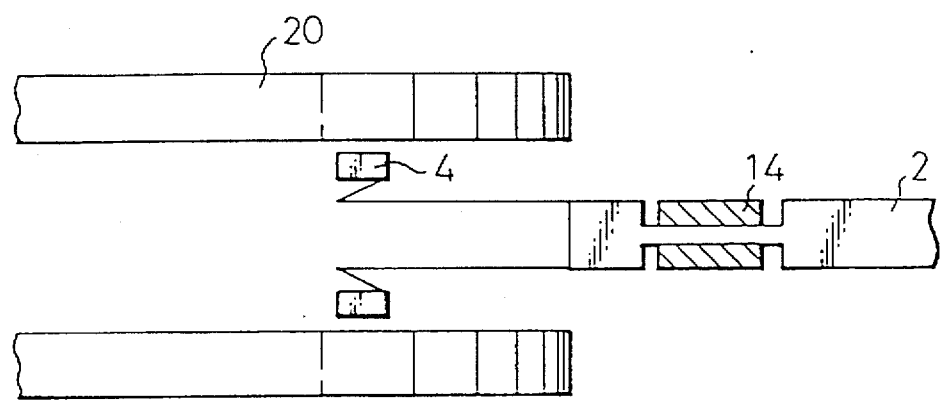
FIG. 21C is a side view showing another construction of the head actuator of FIG. 21A.

FIG. 21C is a side view showing another construction of the head actuator of FIG. 21A. In this example, a head 4 is mounted through a support spring 3 to each of front and rear surfaces of a leading end portion of the access arm 2 having the mechanism for minute movement of a head MT formed thereon.

Figure 22A:
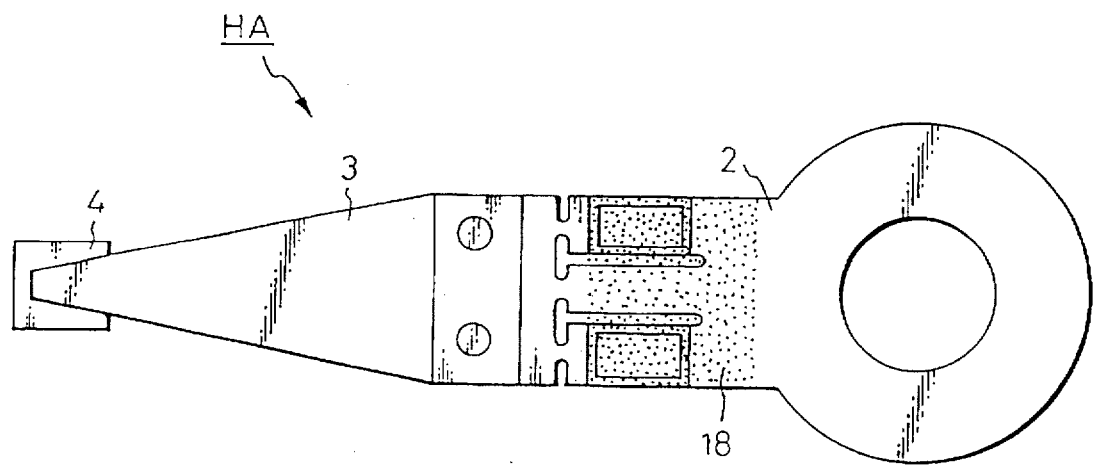
FIG. 22A is a plan view showing a modification of the head actuator of FIG. 21A in the case where damping members are used in the head actuator.

FIG. 22A shows a modification of the head actuator HA of FIG. 21A. In this modification, a damping member 18 is mounted on the head actuator HA. A dotted region in FIG. 22A is a location where the damping member 18 is mounted. The damping member 18 is mounted so as to cover a displacement portion of the mechanism for minute movement of a head MT of the access arm 2.

Figure 22B:
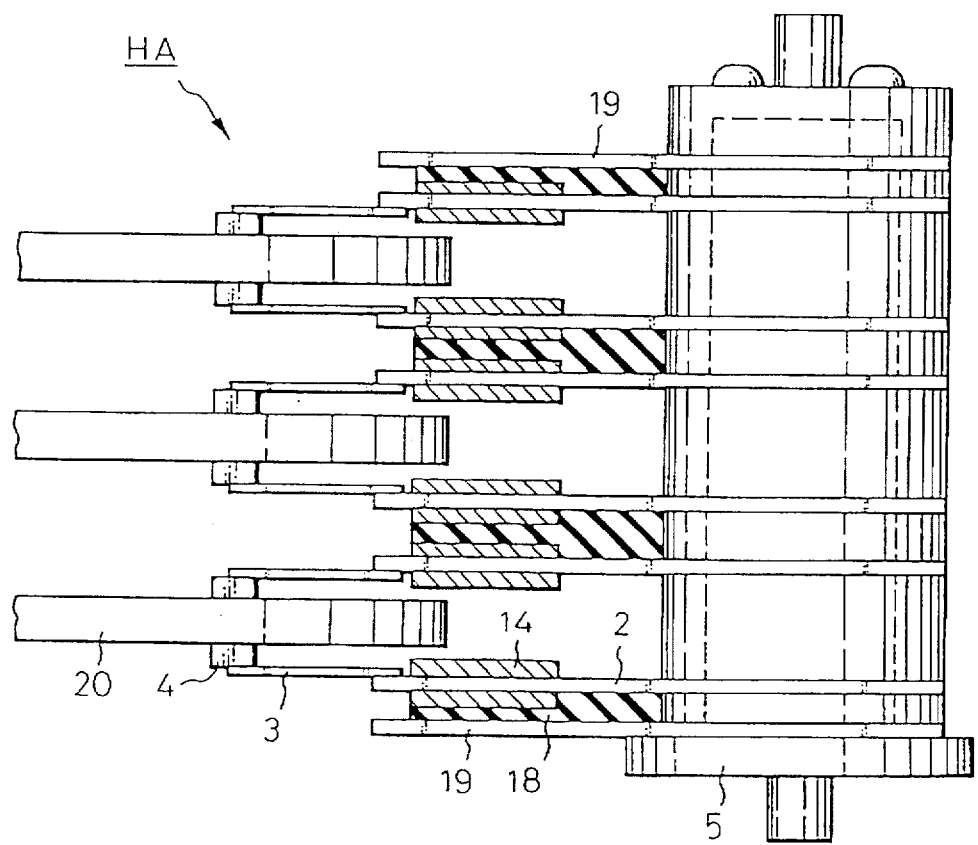
FIG. 22B is a side view showing an exemplary construction of the head actuator of FIG. 22A.

FIG. 22B shows an exemplary construction in which the damping members 18 are mounted in the head actuator HA of FIG. 22A. The mounting of the damping members 18 in the case where two heads 4 are mounted on the single access arm 2 through the support springs 3 was already described with reference to FIGS. 15C and 16C. Accordingly, a description will be given only of the mounting of the damping member with respect to a case where the single head 4 is mounted on the single access arm 2 through the support spring 3. In this example, the damping member 18 is provided between the access arms 2 of the head supporting mechanisms for accessing adjacently arranged recording disks. The head supporting mechanisms at the opposite ends of the actuator HA include a dummy arm 19 each at an outer side thereof, and the damping member 18 is provided between the dummy arm 19 and the access arm 2. Thus, in this example, the out-of-plane vibrations can be reduced in the mechanism for minute movement of a head MT.

Figure 22C:
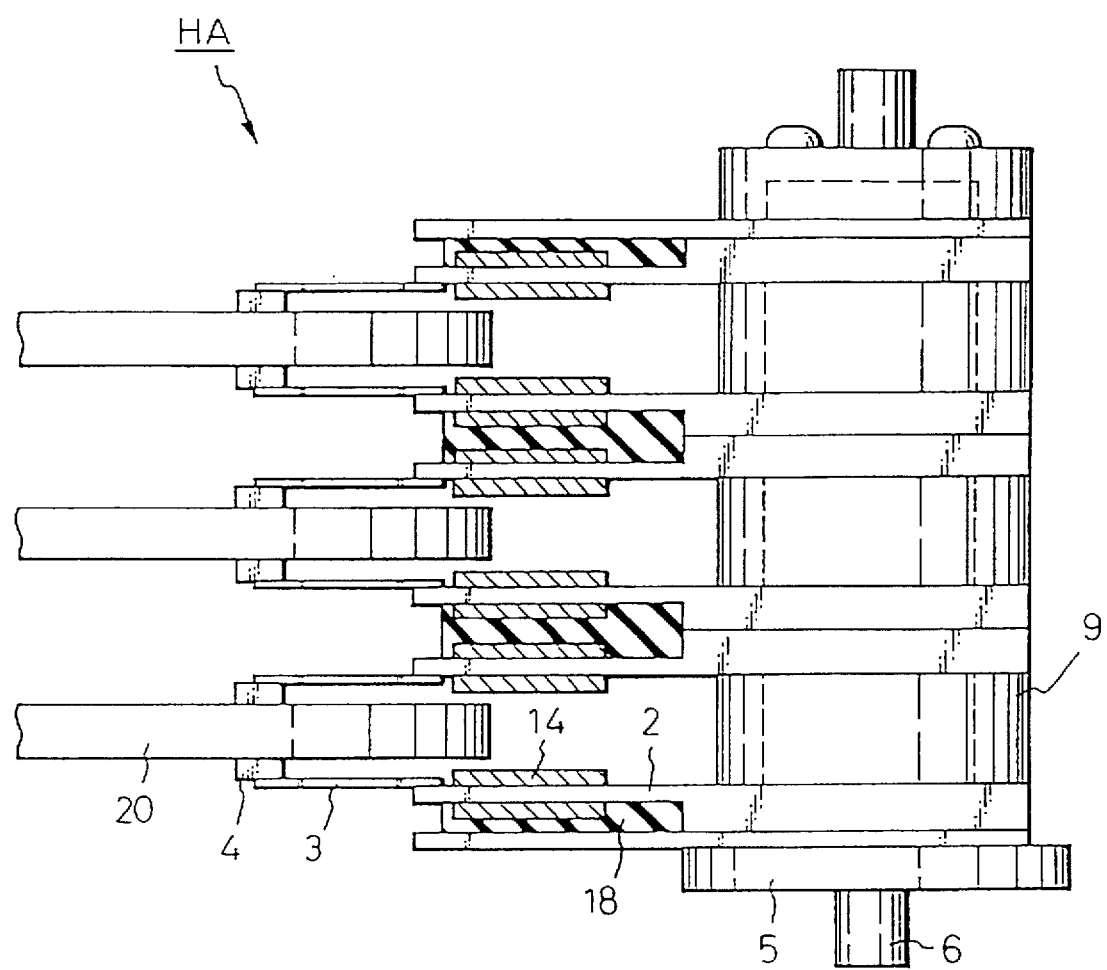
FIG. 22C is a side view showing another construction of the head actuator of FIG. 22A.

FIG. 22C shows another exemplary construction in which the damping members 18 are mounted in the head actuator HA of FIG. 22A. In this example, the ring spacer 9 is not provided at a base portion where the access arms 2 of the head supporting mechanisms for accessing the adjacently located recording disks are mounted on the rotatable shaft 6, and the thickness of the carriages 5 for the access arms 2 is set to a large value. In this example, the number of ring spacers can be reduced.

(Eleventh Embodiment)

Figure 23A:
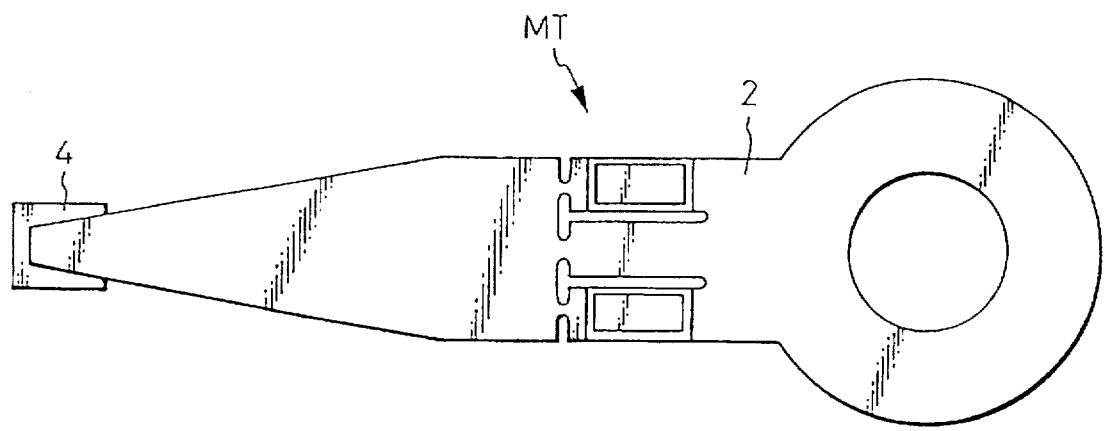
FIG. 23A is a plan view of a head actuator showing a construction of an eleventh embodiment of the invention.

FIG. 23A is a plan view of a head actuator HA excluding a stator, showing a construction of an eleventh embodiment of the invention. In the eleventh embodiment, a mechanism for minute movement of a head MT is formed at a part of an access arm 2 integrally formed with a support spring. The mechanism for minute movement of a head MT shown in FIG. 23A is equivalent to the coupling plate 1-4 of FIG. 14 integrally formed with the access arm 2 and the support spring 3.

Figure 23B:
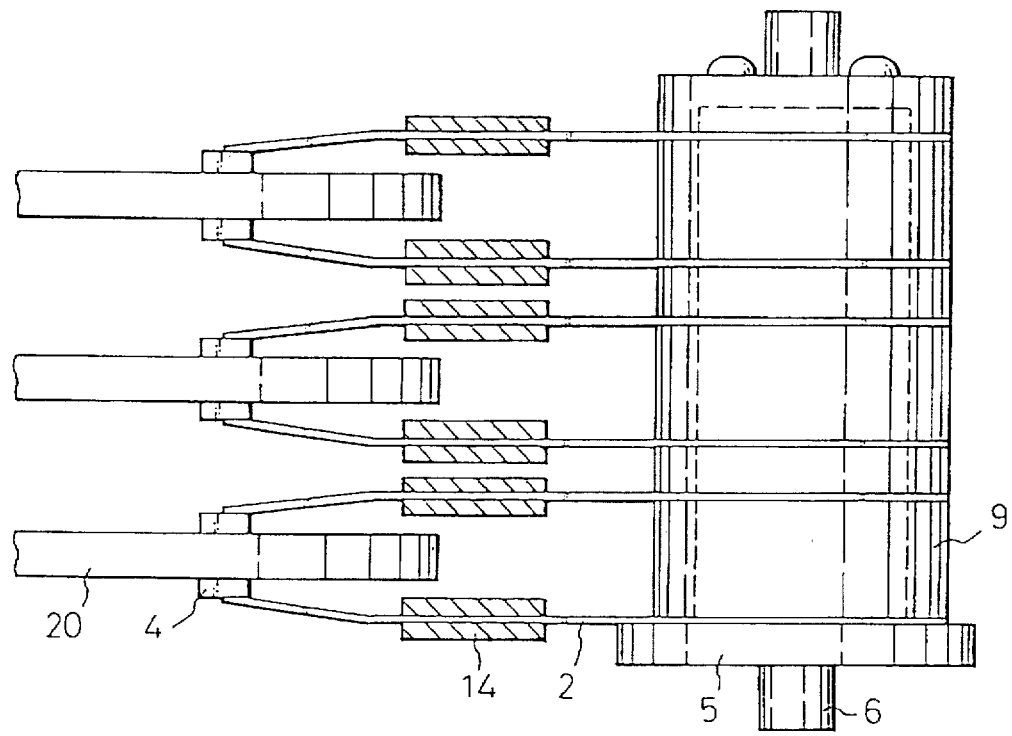
FIG. 23B is a side view showing an exemplary construction of the head actuator of FIG. 23A.

FIG. 23B is a side view showing an exemplary construction of the head actuator HA of FIG. 23A. In this example, three recording disks 20 are provided and six head supporting mechanisms are mounted on a rotatable shaft 6 through ring spacers 9 above a carriage 5. Each head supporting mechanism includes the integral access arm 2 loading the mechanism for minute movement of a head MT thereon, and a head 4 is mounted at a leading end of the access arm 2. Piezoelectric elements 14 are fixed to the mechanism for minute movement of a head. MT on the access arm 2.

Figure 24A:
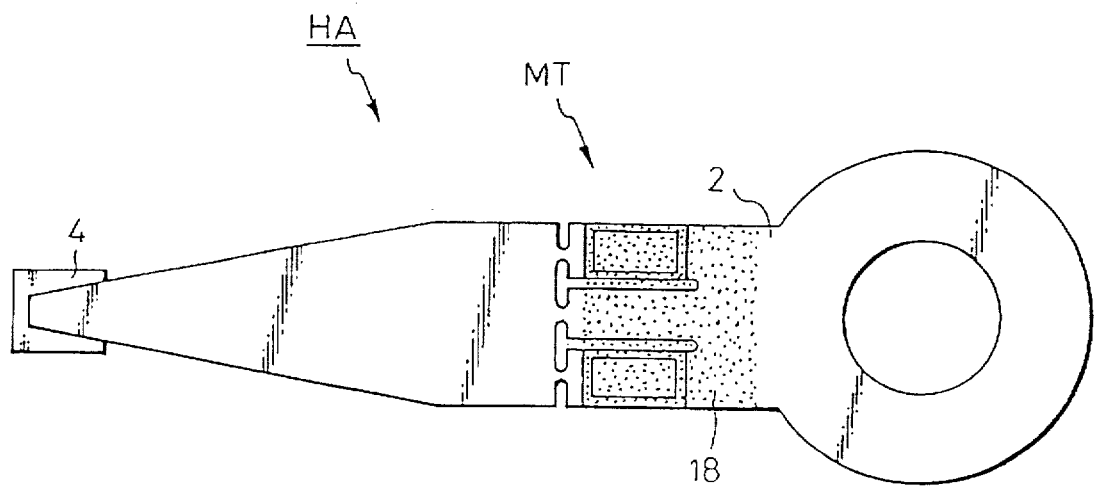
FIG. 24A is a plan view showing a modification of the head actuator of FIG. 23A in the case where damping members are used in the head actuator.

FIG. 24A shows a modification of the head actuator HA of FIG. 23A. In this modification, a damping member 18 is mounted on the head actuator HA. A dotted region in FIG. 24A is a location where the damping member 18 is mounted. The damping member 18 is mounted so as to cover a displacement portion of the mechanism for minute movement of a head MT of the access arm 2.

Figure 24B:
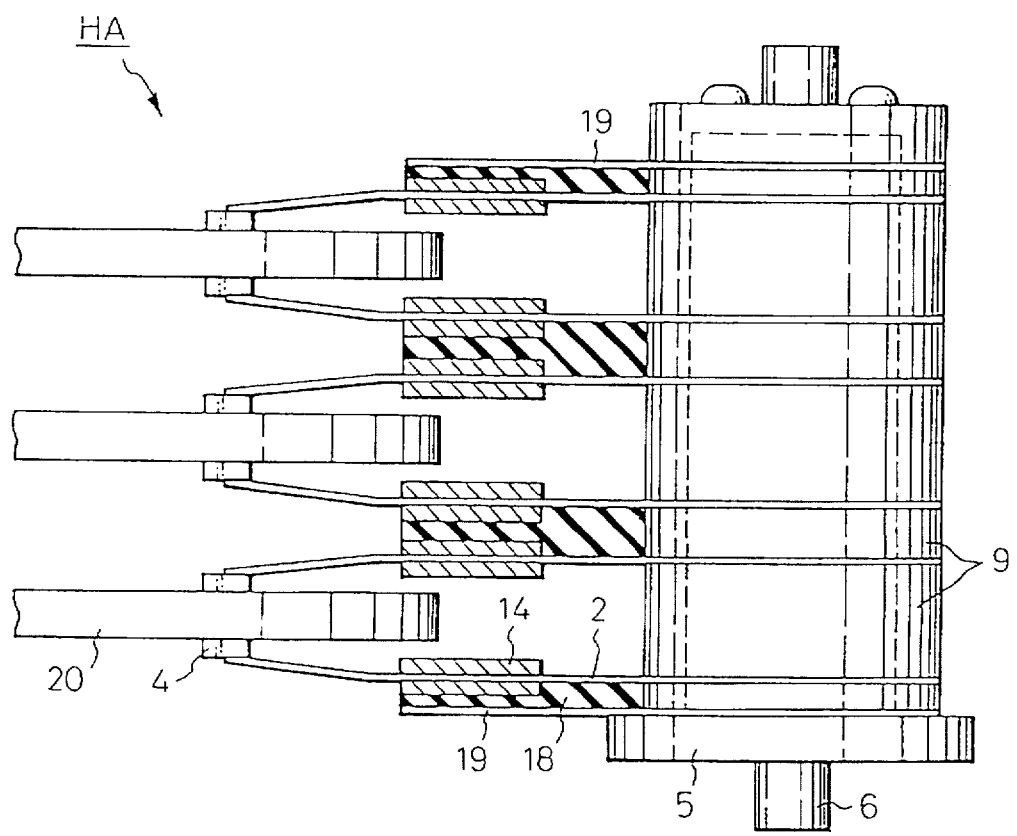
FIG. 24B is a side view showing an exemplary construction of the head actuator of FIG. 24A.

FIG. 24B shows an exemplary construction in which the damping members 18 are mounted in the head actuator HA of FIG. 24A. In this example, the damping member 18 is provided between the access arms 2 of the head supporting mechanisms for accessing adjacently arranged recording disks. The head supporting mechanisms at the opposite ends of the actuator HA include a dummy arm 19 each at an outer side thereof, and the damping member 18 is provided between the dummy arm 19 and the access arm 2. Thus, in this example, the out-of-plane vibrations can be reduced in the mechanism for minute movement of a head MT.

(Twelfth and Thirteenth Embodiments)

Figure 25:
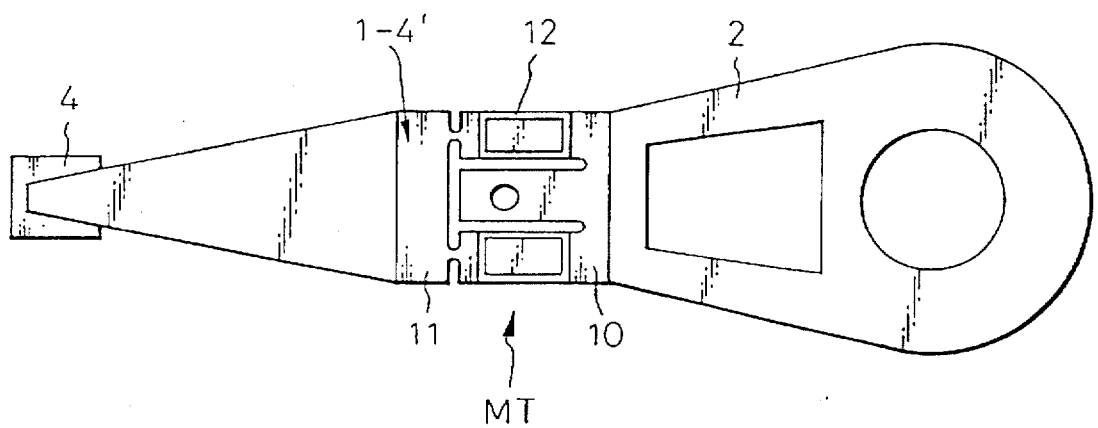
FIG. 25 is a plan view of a head actuator showing a construction of a twelfth embodiment of the invention.
Figure 26:
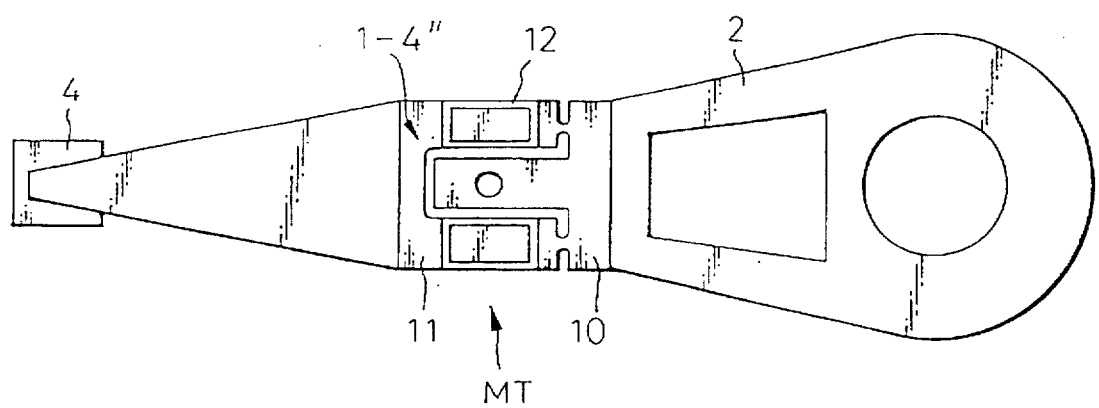
FIG. 26 is a plan view of a head actuator showing a construction of a thirteenth embodiment of the invention.

FIG. 25 is a plan view of a head actuator HA excluding a stator, showing a construction of a twelfth embodiment of the invention, and FIG. 26 is a plan view of a head actuator HA excluding a stator, showing a construction of a thirteenth embodiment of the invention. In these embodiments, the coupling plate 1 is used as a mechanism for minute movement of a head again. In a mechanism for minute movement of a head MT shown in FIG. 25 the coupling plate 1-4' which is obtained by omitting the hinge portion 13 located on the center line CL from the coupling plate 1-4 shown in FIG. 14 to thereby form a continuously extending clearance 15 is used. In a mechanism for minute movement of a head MT shown in FIG. 26, expansion regions 12 in the coupling plate 1-4' shown in FIG. 25 are arranged relative to fixed and movable regions 10, 11 in the opposite direction.

(Fourteenth and Fifteenth Embodiments)

In the foregoing embodiments, a description is given of the pivotal in-line type head actuator HA. However, the mechanism for minute movement of a head according to the invention is not limited in the application to the pivotal in-line type head actuator HA, but may be also applicable to a pivotal dog-leg type head actuator HA and a general linear head actuator HA.

Figure 27:
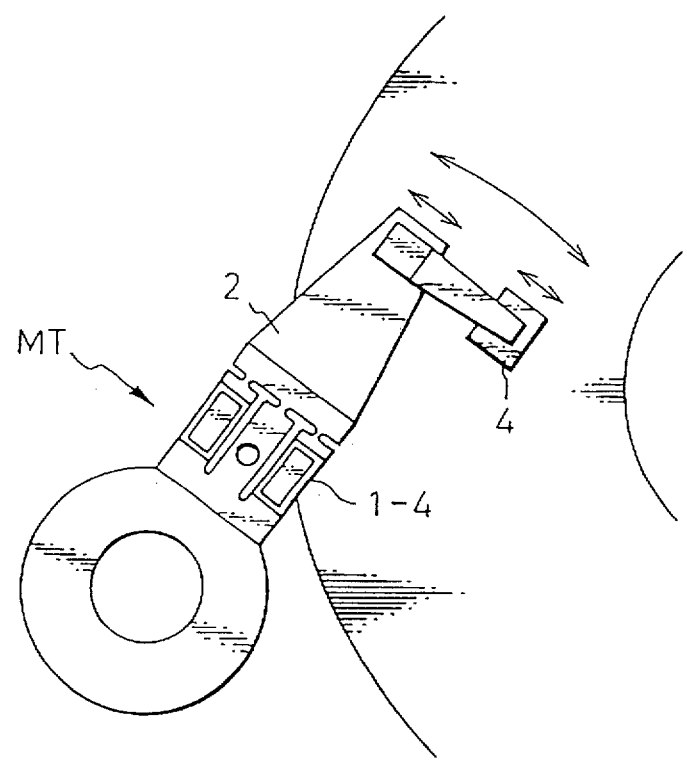
FIG. 27 is a plan view showing a relationship between a disk and a head actuator showing a construction of a fourteenth embodiment of the invention.

FIG. 27 is a plan view showing a relationship between a disk and a pivotal dog-leg type head actuator HA showing a construction of a fourteenth embodiment of the invention. In a mechanism for minute movement of a head of this embodiment the coupling plate 1-4 described with reference to FIG. 14 is used.

Figure 28:
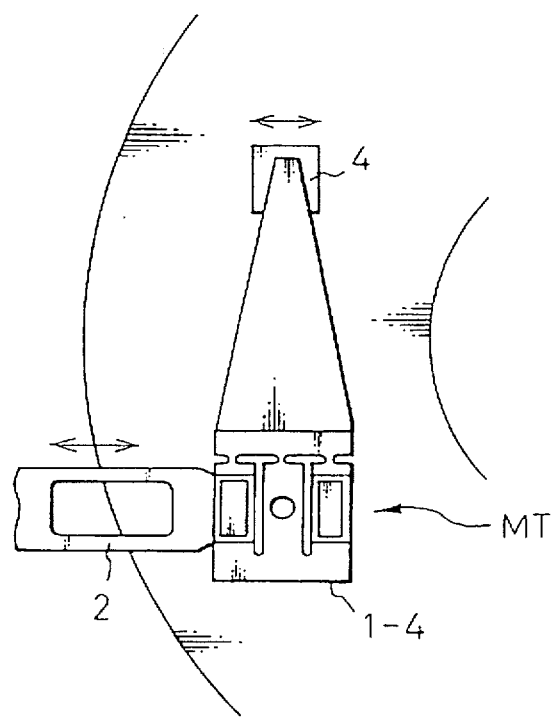
FIG. 28 is a plan view showing a relationship between a disk and a head actuator showing a construction of a fifteenth embodiment of the invention.

FIG. 28 is a plan view showing a relationship between a disk and a general linear head actuator HA showing a construction of a fifteenth embodiment of the invention. In a mechanism for minute movement of a head of this embodiment the coupling plate 1-4 described with reference to FIG. 14 is used.

We claim:

1. A mechanism for minute movement of a head for use in a disk drive including at least one recording disk, a head provided for each information recording surface of the recording disk so as to carry out an information reading/writing operation, and a head actuator for moving the head in a radial direction of the recording disk so as to position the head at a desired recording track on the recording disk, the mechanism for minute movement of the head provided at a part of the head actuator and constructed such that the head can be moved only a small distance independently of an operation of the head actuator, comprising:

at least one pair of expansion and contraction members;

driving means for applying power to said at least one expansion and contraction member; and a coupling plate having continuous top and bottom surfaces which are parallel to a moving plane of the head, said continuous top and bottom surfaces including a fixed region, a movable region, at least one hinge portion and at least one expansion and contraction region, said at least one expansion and contraction region defined as being part of at least one of said top and bottom surfaces of the coupling plate in such a manner that said part of said top and bottom surfaces of the coupling plate can be displaced, said expansion and contraction region having top and bottom surfaces corresponding to said top and bottom surfaces of said coupling plate and having first and second end surfaces, said at least one pair of expansion and contraction members is fixed on top of said top and bottom surfaces of the at least one expansion and contraction region sandwiching said at least one expansion and contraction region therebetween and said expansion and contraction members cause the expansion and contraction region to expand or contract within a plane parallel to the moving plane of the head by deformation of said at least one pair of expansion and contraction members generated according to application of power thereto, said fixed region is provided continuously with said first end surface of the at least one expansion and contraction region, said fixed region is not displaced according to the expansion or contraction of the at least one expansion and contraction region, said movable region is provided continuously with the second end surface of the at least one expansion and contraction region in an expanding direction thereof, and said movable region is displaced according to expansion or contraction of the at least one expansion and contraction region, and said at least one hinge portion is formed between the fixed region and the movable region or between the movable region and the at least one expansion and contraction region and displaces the movable region smoothly within the moving plane of the head.

2. A mechanism for minute movement of a head according to claim 1 wherein the head actuator includes a support spring for supporting the head, an access arm, and a coupling plate for coupling the support spring with the access arm, and wherein the mechanism for minute movement of the head is provided on the coupling plate.

3. A mechanism for minute movement of the head according to claim 1 wherein the head actuator includes a support spring for supporting the head and an access arm having the support spring mounted thereon, and wherein the mechanism for minute movement of the head is provided on the support spring.

4. A mechanism for minute movement of a head according to claim 1 wherein the head actuator includes a support spring for supporting the head and an access arm having the support spring mounted thereon, and wherein the mechanism for minute movement of the head is provided on the access arm.

5. A mechanism for minute movement of a head according to claim 4 wherein two heads are mounted on the single access arm with the mechanism for minute movement of the head loaded thereon.

6. A mechanism for minute movement of a head according to claim 1 wherein the head actuator is formed entirely of a thin plate and the head is mounted at a leading end thereof.

7. A mechanism for minute movement of a head according to any one of claims 1 to 6 wherein the fixed region and the expansion and contraction region are separated from each other by a clearance open to top and bottom surfaces of these regions.

8. A mechanism for minute movement of a head according to claim 7 wherein the fixed region and the movable region are separated from each other by the clearance open to top and bottom surfaces of these regions except at the hinge portion, and wherein the movable region and the expansion and contraction region are connected with each other through another hinge portion.

9. A mechanism for minute movement of a head according to claim 8 wherein the fixed region and the movable region are separated from each other by the clearance open to top and bottom surfaces of these regions except at the hinge portion, wherein the movable region and the expansion and contraction region are connected with each other through another hinge portion, wherein the entirety or most of the expansion and contraction region is arranged so as to overlap with an arm of the access arm loading the coupling plate thereon.

10. A mechanism for minute movement of a head according to claim 1 wherein a connected portion between the movable region and the expansion and contraction region is connected with the fixed region through two hinge portions provided at opposite sides of an island portion.

11. A mechanism for minute movement of a head according to claim 10 wherein the movable region and the fixed region are separated completely from each other by a clearance open to top and bottom surfaces of these regions.

12. A mechanism for minute movement of a head according to claim 1 wherein two expansion and contraction members are mounted in series in the expansion and contraction region.

13. A mechanism for minute movement of a head according to claim 1 wherein a damping member is provided between the access arm and a coupling plate.

14. A mechanism for minute movement of a head according to claim 1 wherein a rectilinear distance between a lateral edge of the expansion and contraction region at a side of the movable region and the hinge portion is set shorter than a rectilinear distance between the head and the hinge portion.

15. A mechanism for minute movement of a head according to claim 1 wherein the expansion and contraction region is formed by thinning a region between the fixed region and the movable region.

16. A mechanism for minute movement of a head according to claim 1 wherein the at least one expansion and contraction member on the top and bottom surfaces of the expansion and contraction region is arranged symmetrically with respect to a center line of thickness of the expansion and contraction region.

17. A mechanism for minute movement of a head according to claim 7 wherein a damping member is filled in the clearance.

18. A mechanism for minute movement of a head according to claim 1 wherein the at least one expansion and contraction member is a piezoelectric element.

19. A mechanism for minute movement of a head according to claim 18 wherein the expansion and contraction region exists as a common electrode for the piezoelectric element.

20. A mechanism for minute movement of a head according to claim 18 or 19 wherein the piezoelectric element is a multilayer piezoelectric element in which a plurality of piezoelectric elements are laminated one over another in a direction normal to a plane where the expansion and contraction region expands and contracts.

21. A mechanism for minute movement of a head according to claim 1 wherein the at least one expansion and contraction member is a heating wire.

22. A mechanism for minute movement of a head according to claim 1 wherein the expansion and contraction region is arranged such that an expanding direction thereof is substantially orthogonal to a straight line connecting an end of the expansion and contraction region at a side of the movable region and the hinge portion.

23. A mechanism for minute movement of a head according to claim 1 wherein at least a pair of expansion and contraction regions are arranged on opposite sides of the mechanism for minute movement of a head with respect to a center line thereof.

24. A mechanism for minute movement of a head according to claim 23 wherein the pair of expansion and contraction regions are arranged symmetrically with respect to the center line.

19

25. A mechanism for minute movement of a head according to claim 24 wherein the hinge portion provided between the clearances is located on the center line.

26. A mechanism for minute movement of a head according to claim 24 or 25 wherein expansion and contraction members arranged at opposite sides of the center line are deformable in opposite directions simultaneously.

27. A mechanism for minute movement of a head according to claim 1 wherein the disk drive includes a plurality of head actuators.

28. A mechanism for minute movement of a head according to claim 27 wherein a damping member is provided between two adjacently located mechanisms for minute movement of heads.

29. A mechanism for minute movement of a head according to claim 1 wherein said hinge portion includes a center hinge portion and two side hinge portions arranged on both sides of said center hinge portion.

30. A mechanism for minute movement of a head according to claim 29 wherein said two side hinge portions are not arranged on one line.

31. A mechanism for minute movement of a head according to claim 29 wherein said side hinge portions are arranged on both sides of said center hinge portion at an angle.

32. A mechanism for minute movement of a head according to claim 1, wherein said expansion and contraction region is a recessed portion of said surface of said coupling plate.

33. A mechanism for minute movement of a head according to claim 32, wherein said expansion and contraction member is fixed within said recessed portion.

34. A mechanism for minute movement of a head for use in a disk rive including at least one recording disk, a head provided for each information recording surface of the recording disk so as to carry out an information reading/writing operation, and a head actuator for moving the head in a radial direction of the recording disk so as to position the head at a desired recording track on the recording disk, the mechanism for minute movement of the head provided at a part of the head actuator and constructed such that the head can be moved only a small distance independently of an operation of the head actuator, comprising:

at least one pair of expansion and contraction members;

driving means for applying power to said at least one pair of expansion and contraction members; and a coupling plate having continuous top and bottom surfaces including a fixed region, a movable region, at least one hinge portion and at least one expansion and contraction region, said at least one expansion and contraction region defined as being an indentation in part of at least one of said top and bottom surfaces of the coupling plate in such a manner that said part of said top and bottom surfaces of the coupling plate can be displaced, said expansion and contraction region having top and bottom surfaces corresponding to said top and bottom surfaces of said coupling plate and having first and second end surfaces, said at least one pair of expansion and contraction members is fixed within the indentation on both said top and bottom surfaces of the at least one expansion and contraction region sandwiching said at least one expansion and contraction region therebetween and said expansion and contraction members cause the expansion and contraction region to expand or contract within a plane parallel to the moving plane of the head by deformation of said at least one pair of expansion

20 and contraction members generated according to application of power thereto, said fixed region is provided continuously with said first end surface of the at least one expansion and contraction region, said fixed region is not displaced according to the expansion or contraction of the at least one expansion and contraction region, said movable region is provided continuously with the second end surface of the at least one expansion and contraction region in an expanding direction thereof, and said movable region is displaced according to expansion or contraction of the at least one expansion and contraction region, and said at least one hinge portion is formed between the fixed region and the movable region or between the movable region and the at least one expansion and contraction region and displaces the movable region smoothly within the moving plane of the head.

35. A mechanism for minute movement of a head according to claim 34 wherein said coupling plate having a first thickness and said indentation having a second thickness which is less than said first thickness.

36. A mechanism for minute movement of a head for use in a disk drive including at least one recording disk, a head provided for each information recording surface of the recording disk so as to carry out an information reading/writing operation, and a head actuator for moving the head in a radial direction of the recording disk so as to position the head at a desired recording track on the recording disk, the mechanism for minute movement of the head provided at a part of the head actuator and constructed such that the head can be moved only a small distance independently of an operation of the head actuator, comprising:

at least one pair of expansion and contraction members;

driving means for applying power to said at least one pair of expansion and contraction members; and a coupling plate having continuous top and bottom surfaces including a fixed region, a movable region, hinge portions and at least one expansion and contraction region, said at least one expansion and contraction region defined as being part of at least one of said top and bottom surfaces of the coupling plate in such a manner that said part of said top and bottom surfaces of the coupling plate can be displaced, said expansion and contraction region having top and bottom surfaces corresponding to said top and bottom surfaces of said coupling plate and having first and second end surfaces, said at least one pair of expansion and contraction members is fixed onto both said top and bottom surfaces of the at least one expansion and contraction region sandwiching said at least one expansion and contraction region therebetween and said expansion and contraction members cause the expansion and contraction region to expand or contract within a plane parallel to the moving plane of the head by deformation of said at least one pair of expansion and contraction members generated according to application of power thereto, said fixed region is provided continuously with said first end surface of the at least one expansion and contraction region, said fixed region is not displaced according to the expansion or contraction of the at least one expansion and contraction region, said movable region is provided continuously with the second end surface of the at least one expansion and contraction region in an expanding direction thereof, and said movable region is displaced according to expansion or contraction of the at least one expansion and contraction region, and said hinge portions are formed between the fixed region and the movable region or between the movable region and the at least one expansion and contraction region and said hinge portions displace the movable region smoothly within the moving plane of the head, wherein hinge portions include a center hinge and side hinge portions each provided on opposite sides of the center line and wherein a line connecting the center hinge and each of the side hinge portions is not perpendicular to the center line.

37. A mechanism for minute movement of a head for use in a disk drive including at least one recording disk, a head provided for each information recording surface of the recording disk so as to carry out an information reading/writing operation, and a head actuator for moving the head in a radial direction of the recording disk so as to position the head at a desired recording track on the recording disk, the mechanism for minute movement of the head provided at a part of the head actuator and constructed such that the head can be moved only a small distance independently of an operation of the head actuator, comprising:

at least one pair of expansion and contraction members each having a solid plate shape;

driving means for applying power to said at least one pair of expansion and contraction members; and a coupling plate having continuous top and bottom surfaces which are parallel to a moving plane of the head, said continuous top and bottom surfaces including a fixed region, a movable region, at least one hinge portion and at least one expansion and contraction region, said at least one expansion and contraction region defined as being made of a solid material and as being part of at least one of said top and bottom surfaces of the coupling plate in such a manner that said part of said top and bottom surfaces of the coupling plate can be displaced, said expansion and contraction region having top and bottom surfaces corresponding to said top and bottom surfaces of said coupling plate and having first and second end surfaces and wherein an expansion and contraction force is not generated by said at least one expansion and contraction region, said at least one pair of expansion and contraction members is fixed on top of both said top and bottom surfaces of the at least one expansion and contraction region sandwiching at least one expansion and contraction region therebetween and said expansion and contraction members cause the expansion and contraction region to expand or contract within a plane parallel to the moving plane of the head by deformation of said at least one pair of expansion and contraction members generated according to application of power thereto, said fixed region is provided continuously with said first end surface of the at least one expansion and contraction region, said fixed region is not displaced according to the expansion or contraction of the at least one expansion and contraction region, said movable region is provided continuously with the second end surface of the at least one expansion and contraction region in an expanding direction thereof, and said movable region is displaced according to expansion or contraction of the at least one expansion and contraction region, and said at least one hinge portion is formed between the fixed region and the movable region or between the movable region and the at least one expansion and contraction region and displaces the movable region smoothly within the moving plane of the head.

\* \* \* \* \*